US007694284B2

(12) United States Patent  (10) Patent No.: US 7,694,284 B2
Berg et al.  (45) Date of Patent: Apr. 6, 2010

(54) SHAREABLE, BIDIRECTIONAL MECHANISM FOR CONVERSION BETWEEN OBJECT MODEL AND XML

(75) Inventors: Daniel Berg, Cary, NC (US); Michael D. Elder, Durham, NC (US); Derek F. Holt, Durham, NC (US); L. Scott Rich, Cary, NC (US); Ritchard L. Schacher, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 11/000,296

(22) Filed: Nov. 30, 2004

(65) Prior Publication Data

US 2008/0010629 A1    Jan. 10, 2008

(51) Int. Cl.
*G06F 9/45* (2006.01)
(52) U.S. Cl. ........................ 717/137; 717/143
(58) Field of Classification Search .......... 717/137–143
See application file for complete search history.

(56) References Cited

U.S. PATENT DOCUMENTS

| 6,446,256 | B1* | 9/2002 | Hyman et al. | 717/143 |
|---|---|---|---|---|
| 6,745,208 | B2* | 6/2004 | Berg et al. | 707/201 |
| 6,968,503 | B1* | 11/2005 | Chang et al. | 715/526 |
| 7,017,112 | B2* | 3/2006 | Collie et al. | 715/212 |
| 7,055,142 | B2* | 5/2006 | Meredith et al. | 717/136 |
| 7,117,487 | B2* | 10/2006 | Meredith et al. | 717/143 |
| 7,216,335 | B2* | 5/2007 | Meredith et al. | 717/114 |
| 7,249,316 | B2* | 7/2007 | Collie et al. | 715/513 |
| 7,257,594 | B2* | 8/2007 | Tamboli et al. | 707/101 |
| 2002/0099792 | A1 | 7/2002 | Brandin et al. | 709/218 |
| 2003/0014397 | A1 | 1/2003 | Chau et al. | 707/3 |

(Continued)

FOREIGN PATENT DOCUMENTS

GB    2357348 A    6/2001
GB    2359157 A    8/2001

OTHER PUBLICATIONS

Yoon et al., "Development of SNMP-XML translator and gateway for XML-based integrated network management," *Intl. J. Network Management*, 13, 259-276 (2003).
Lee et al., "NeT & CoT: Translating Relational Schemas to XML Schemas using Semantic Constraints," *CIKM'02*, pp. 282-291 (2002).

*Primary Examiner*—Wei Y Zhen
*Assistant Examiner*—Matthew J Brophy
(74) *Attorney, Agent, or Firm*—Patents on Demand, P.A.; Scott M. Garrett

(57) ABSTRACT

The concept of "renderers" and "translators" is introduced in connection with bidirectional conversion between object models and XML. A renderer embodies the logic responsible for mediating the parser specific APIs for reading and writing XML. It utilizes a plurality of translator objects, which embody the mapping information needed to convert the XML into object model instances. The translator objects themselves do not contain "knowledge" of parser implementations; thus, the translators are common and can be shared and reused by any and all renderer implementations. Since each translator embodies the knowledge and rules regarding how to convert an XML model to an object model, and how to convert object models to XML, it is thus independent of the particular renderer that is being used, whether it be SAX, DOM, or some other renderer.

28 Claims, 16 Drawing Sheets

U.S. PATENT DOCUMENTS

| | | | |
|---|---|---|---|
| 2003/0050931 A1 | 3/2003 | Harman et al. | 707/100 |
| 2003/0204645 A1* | 10/2003 | Sharma et al. | 709/328 |
| 2003/0220930 A1 | 11/2003 | Milleker et al. | 707/100 |
| 2004/0168124 A1* | 8/2004 | Beisiegel et al. | 715/513 |

* cited by examiner

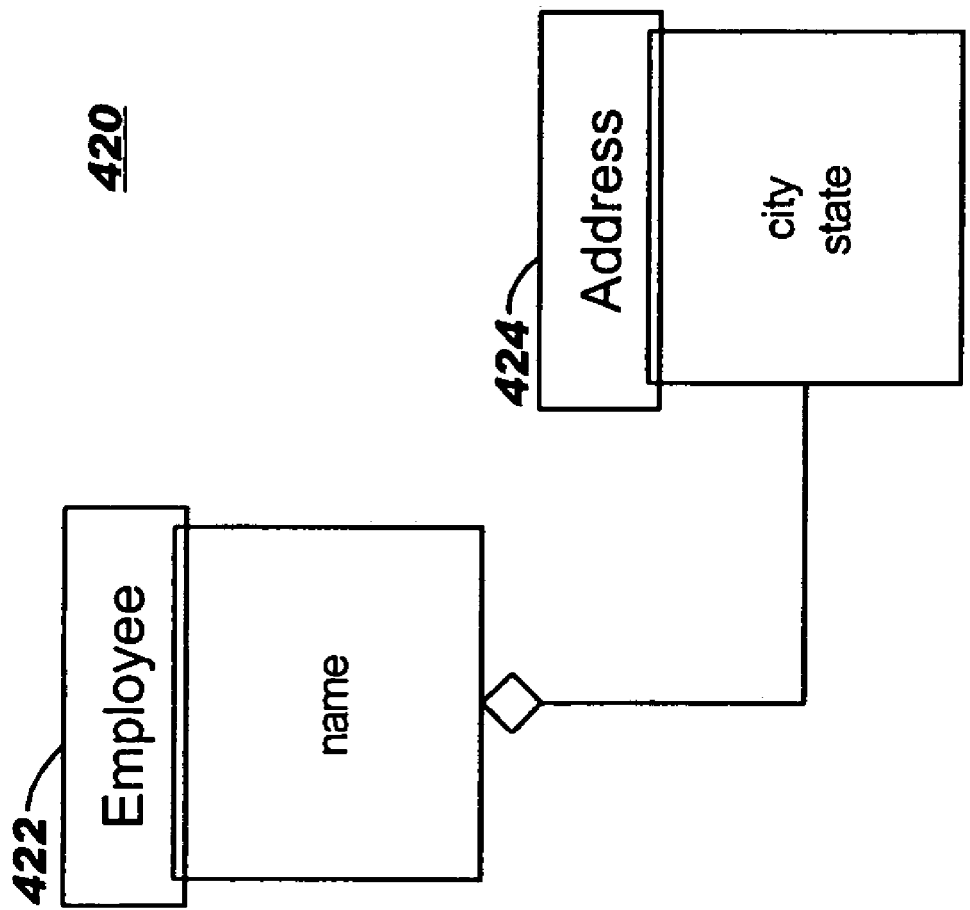

FIG. 10 Load using Translator Framework SAX

FIG. 11  Load using Translator Framework DOM

Save using Translator Framework SAX

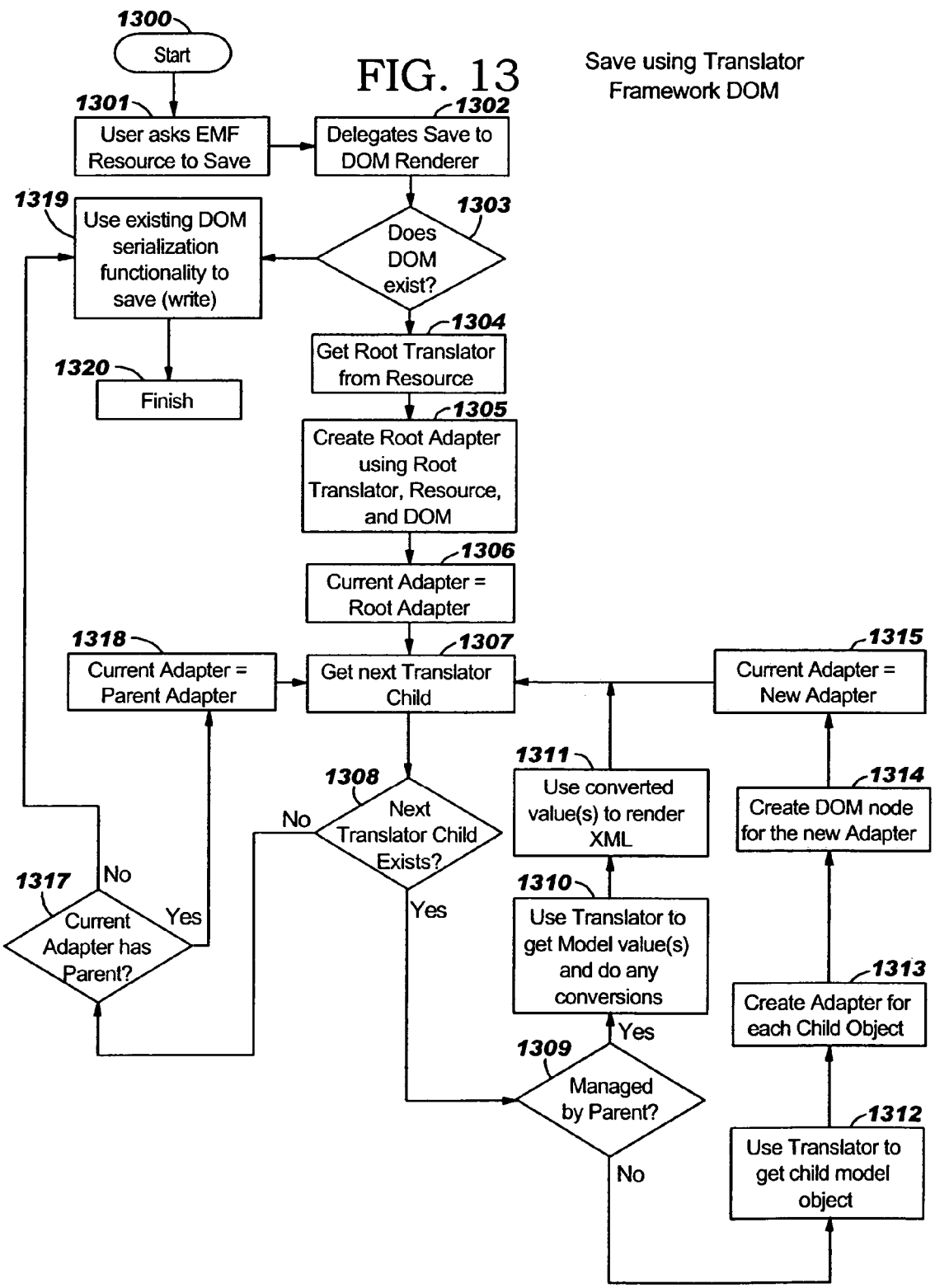

SHAREABLE, BIDIRECTIONAL MECHANISM FOR CONVERSION BETWEEN OBJECT MODEL AND XML

BACKGROUND OF THE INVENTION

Field of the Invention

This invention pertains to a method, system, and computer program product for the translation of XML documents to object models, and vice versa.

XML (extensible Markup Language) is a platform-independent programming language that is particularly adapted for use on distributed networks such as the Internet because it provides a flexible mechanism for creating common information formats and sharing both the format and the data across different software applications over the network. XML comprises markup symbols (tags) that describe the content of a file. XML is like HTML (HyperText Markup Language) in its use of markup symbols, but it has at least two key distinctions over HTML. First, HTML has a specific set of defined markup symbols, whereas XML is extensible in that the markup symbols allowed in XML are unlimited and self-defining. That is, while XML also has standardized markup symbols, XML programmers are not limited to the standard set of defined markup symbols, but can define new markup symbols. Secondly, whereas HTML is limited in that the tags and attributes define only how the actual content is to be displayed, XML tags and attributes can define both how the information is to be displayed (by a web browser, for instance) and what the content is. In this specification, a basic familiarity with XML is assumed in the reader.

Because of its flexibility and readability, XML is often used as a serialization mechanism for an object model. That is, a programmer can define XML markup symbols to correspond to certain types of data and then create XML files (XML files are also called XML documents or XML pages) that can be converted to provide content associated with the tags and attributes. For instance, if a programmer wishes to establish a standard format for describing a type of product so that the description of products of that type can be shared across multiple applications with different platforms, the programmer can define a generic tag that corresponds to that product, e.g., "SHIRT", and attributes of that tag, each defining a property of that product, e.g., a "SIZE" attribute, a "COLOR" attribute, a "MATERIAL" attribute, a "COST" attribute, etc. The actual data content, e.g., large, red and blue stripes, cotton, $29.95, etc. is provided in the field of the attribute. The data about the product (the data content) can then be transmitted over a network in a platform-independent XML page to any other computer running an XML interpreter program that is programmed to convert and understand those particular tags.

An application software program that is developed using object-oriented techniques is usually based on an underlying "object model". An object model is a collection of related "objects" that describe the data and behavior of the system. Often the objects describe real-world entities. For example, an object named "Address" might have attributes named "Street", "City", etc., and methods or functions named "getStreet( )", "getCity( )", etc. In a well built software system, the underlying object model is designed as a layer, independent of other services in a system, e.g., transport mechanisms, user interfaces, data storage, etc. In such a manner, the object model becomes a reusable component that can be included in other applications.

In applications where XML is used, it is common practice to model the data contained in the XML document as an object model. Conversely, it is common to have an existing object model and to use XML as a serialization format. For example, an XML entity with tags <address>/<address> would be modeled as an object name "Address". Thus, the code of other application components, e.g., user interfaces, can interact with the objects in the object model and not with the underlying XML. This provides a nice layer of abstraction that separates the meaning of the data in the system from the actual mechanics of reading and writing the XML. Thus, there will exist a layer in the system that converts an object model to XML, and vice versa. In some cases the data elements in the XML map to values in the object model in a simple and straightforward manner, as in the example above. It is often the case, however, where the mappings are not simple and complex rules exist to execute the conversions.

Generically speaking, there are three basic steps involved in the process of converting an XML document into an object model. First, every character in the XML text is analyzed to recognize "legal" XML tokens such as start tags, attributes, end tags, and CDATA sections. Second, the tokens are analyzed to verify that they form legal XML constructs (e.g., that all of the tagging has matching opening and closing tags). Finally, in a translation process, the data contained in the XML document is converted to data elements and objects belonging to the object model and set accordingly. The data elements might represent simple attributes in the object model or other objects. For example, an "address" has a "city", which is a simple attribute. An "employee" has an "address", which is a complex type representing another object in the object model. Both the attribute on address and the object association between employee and address can generically be referred to as a "structural feature" or simply "feature".

When an application program (e.g., an XML editor) receives an XML document, several steps are performed to convert that XML document into a displayed (or rendered) page on the user's computer monitor. In one well-known scheme, first, the XML document is opened and parsed to build a document object model (DOM) containing the data. DOM is a programming interface specification developed by the World Wide Web Consortium (W3C) that lets a programmer create and edit HTML and XML files as program objects. The W3C has recently issued a DOM Level 2 specification which is incorporated herein by reference. A DOM essentially is a tree data structure representation of an XML file, wherein each node of the tree is an XML element, e.g., a tag, an attribute, a value, etc. After the DOM is generated, it is traversed to create an object model. Where the XML pages are to be converted into a display, the object model is the model from which a logical display is directly rendered. Thus, the process of rendering an XML page can be considered to comprise four steps: (1) the XML document step, (2) the document object model step, (3) the object model step, and (4) the actual display step.

There are other cases where an application needs to read the contents of an XML document and populate an object model, not for editing or graphical display, but for the purpose of using the data contained within for further processing. One example is a J2EE (Sun Microsystems) application server, which loads XML "deployment descriptors" for the purpose of deploying the application on the web. In many cases, particularly for the start up of the application server, the XML document is loaded for read-only; its contents will never be modified. Moreover, performance is critical in these types of applications; speed and memory footprint are of the utmost importance. Under these constraints, creating a DOM model adds unnecessary memory and CPU requirements. A different method for loading the document and converting it to an object model is required. Well known methods exist; one commonly used example is the Simple API for XML (SAX).

As described above, the object model becomes a reusable component. It is often the case that the same object model is used in both "tools" and "runtime" applications. The tools are the application programs used to create, edit, and update the XML files to be used by a production application, such as a J2EE enterprise application to be deployed on an application server. The runtimes are the actual consumers of these artifacts; for example, the J2EE application server itself. Requirements for the tools are much different from those for the runtime.

While the tools applications need to be somewhat fast, speed is not as much of a concern as ease of use. The files need to be presented in what-you-see-is-what-you-get (WYSIWYG) format, and updates to the text should be reflected in the object model and vice-versa. Therefore, use of the DOM method for loading and saving the XML documents makes sense for tools. As described above, the use of SAX or some other fast method makes more sense for the runtime. In the prior art, the way to deal with this difference in requirements has been to write two separate implementations (one for DOM, the other for SAX) for loading and saving the documents and converting from XML to the object model and vice-versa, even though there may be common patterns in the two code sets. This is costly and creates maintenance problems. In many cases, very complex rules exist for translating the XML to the object model, and the code for carrying this out is essentially in two places. This effectively doubles the testing effort, it can leave subtle inconsistencies between the tooling and runtime programs, and it doubles the cost of making changes. Further, the coding for the DOM implementation and the coding for the SAX implementation may be created by different programmers or programming teams. This can lead to differing results in the rendered object models.

The first two steps, that is, the analysis of the XML text characters and the verification that the tokens contained in the text characters form legal XML constructs, can be easily accomplished using "off-the-shelf" XML parsers. The above-described DOM and SAX APIs are supported by most JAVA programming language-based XML parsers. However, the third step, the translation/mapping process, can vary greatly, largely due to the different methods of operation of the various parsing standards. For example, the DOM API is an object-model-based API. When parsed by an XML parser that implements DOM, a generic document object model is created in memory that represents the contents of the XML document. This document object model is a tree data structure representation of the XML file, wherein each node of the tree is an XML element, e.g., a tag, and attribute, a value, etc. After the document object model is generated it is traversed to create an application object model. The tree offers information about both the structure and contents of the XML document, and this information is used in the translation process to facilitate proper mapping.

The SAX API, on the other hand, is event-based, and thus does not utilize a document object model. It is typically used in cases where an in-memory construct of the entire XML tree does not need to be created or preserved. Events are processed as the document is parsed and the parser itself discards data after forwarding it to the application via the events. This is useful where an application needs to read the contents of an XML document and populate the object model, not for editing or graphical display, but for the purpose of using the data contained within for further processing, as in the example given above.

Due to the above-described differences, the translation/mapping process used to generate the object model differ substantially in the prior art. The translation process for XML parsed in a DOM implementation requires a mapping of the various nodes of the DOM to the features of the object model. The translation of XML parsed in a SAX implementation requires mapping of the various events generated by the SAX API to the features of the object model.

It would be desirable to have a way to isolate the rules for translation (both simple and complex) into one, common-shared set of code. The code for the rules would need to be independent of the parser implementation used for reading and writing XML. This common code could then be bundled along with the common object model for use by both tools and runtimes, thus eliminating the duplication of code inherent in the prior art.

Accordingly, it is an object of the present invention to provide an improved method for loading and saving XML documents, and converting the data to and from an object model, independently of the parser implementation used.

SUMMARY OF THE INVENTION

The present invention introduces the concept of "renderers" and "translators". A renderer embodies the logic responsible for mediating the parser specific APIs for reading and writing XML. The renderer utilizes a plurality of translator objects, which embody the mapping information needed to convert the XML into object model instances. The translator objects themselves do not contain "knowledge" of parser implementations; that is, there is no parser specific dependency in the translators, nor any parser specific API usage encoded in the translator implementations. Thus, the translators are common and can be shared and reused by any and all renderer implementations. A given renderer implementation is built once and works the same for all translators; a translator mapping a meta model feature to XML tag data is encoded once and works the same for all renderers.

The present invention assumes that a meta model is being used, that is, a model that describes the object model and how the different objects in that model relate to one another. This aspect is a well known method of prior art systems. Examples of such meta models include the Eclipse Modeling Framework (EMF) and JavaBeans software componets. In its simplest form, the translator is a mapping between a tag name in XML and a feature of the meta model, along with associated behavior necessary to use the feature of the meta model to convert values to and from XML. As there is a meta model that describes the object model, there is also XML meta data that describes the form and tag names of the XML. As an application system that uses the present invention is designed, the mappings from XML to meta model meta data are encoded into translator classes, either generic or custom, and generated either by hand or by an automated tool. Just as object model objects "contain" references to other "child" objects, and XML "nodes" have child nodes, so the translators also contain references to child translators, thus forming a tree structure that resembles the object model and XML meta models. When an XML file is processed and loaded, a top level or "root" translator is accessed.

Since each translator embodies the knowledge and rules regarding how to convert an XML model to an object model, and how to convert object models to XML, it is thus independent of the particular renderer that is being used, whether it be SAX, DOM, or some other renderer. All of the complex rules that do the mapping are embodied in the translator, and thus if changes need to be made, they are made at the translator level. This allows the translators to be generic unless, as in a smaller number of cases, there is complex logic that needs to be executed in order to do the translation. Custom rules are input for these particular translations to deal with these situations. Even in the custom case, the translator itself contains no "knowledge" of SAX, DOM, or any other rendering mechanism, but rather only knows how to execute the conversions, such that the translator is shared by all renderer embodiments.

In the prior art systems, the function of the translator of the present invention is encapsulated within the adapter, which binds the user to using the DOM model for DOM translations, the SAX model for SAX translations, etc. In the present invention, the working of the DOM has been separated from the translation rules. Thus, the present invention removes the binding of the mapping logic of the two domains from the adapters and places it in a generic object (the translator). This allows the use of different parser mechanisms that may or may not keep the domains in sync at all times, i.e., the system is very flexible. The mapping logic can be reused such that the parser/renderer that works best in any particular condition can be used without having to rewrite all of the mapping logic to fit the parsing implementation.

BRIEF DESCRIPTION OF THE DRAWINGS

FIGS. 4B and 4C illustrate an example model in accordance with the present invention;

FIG. 13 illustrates the process of saving XML documents using the DOM Renderer implementation described in FIG. 5 in accordance with a preferred embodiment of the present invention.

DETAILED DESCRIPTION OF THE PREFERRED EMBODIMENTS

Figure 1A:
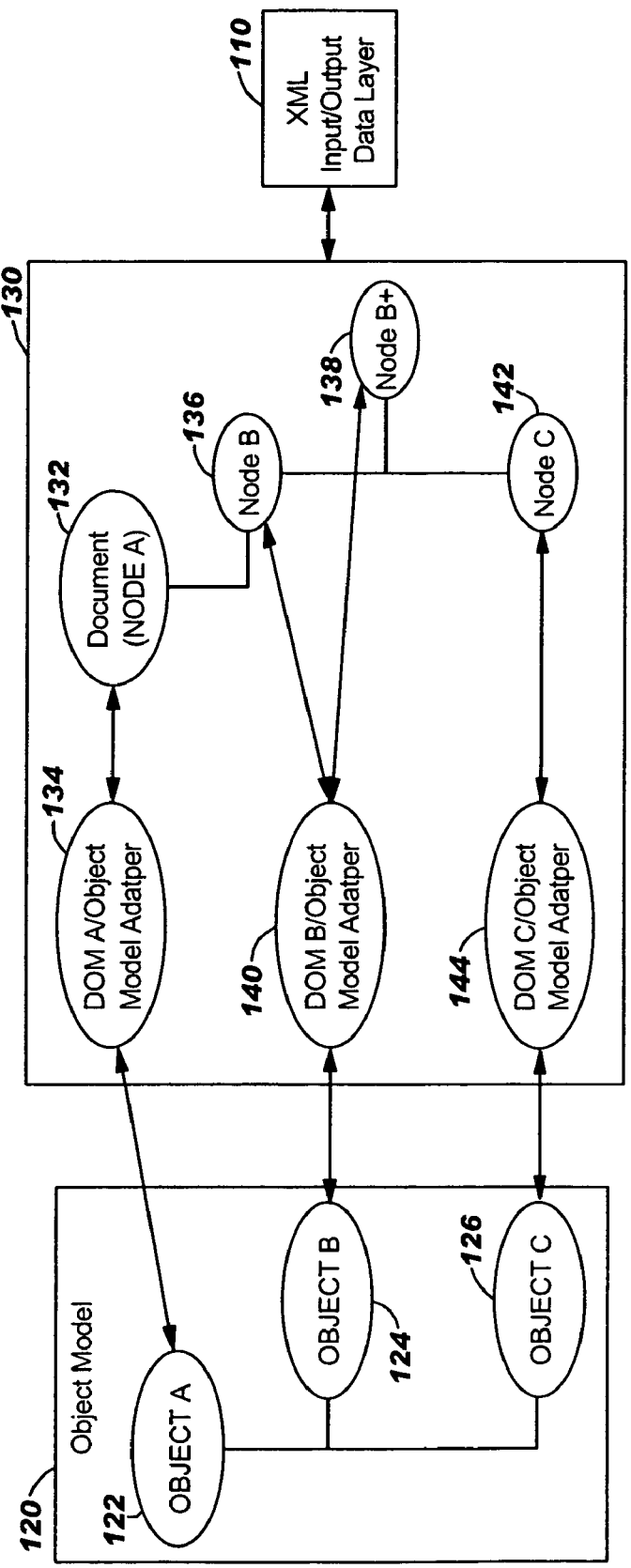
FIG. 1A is a block diagram illustrating the basic components of a prior art method and apparatus for synchronizing an XML document with its object model.

FIG. 1A is a block diagram illustrating the basic components of a prior art method and apparatus for synchronizing an XML document with its object model. The invention illustrated in FIG. 1A is disclosed and claimed in commonly assigned U.S. Pat. No. 6,745,208. Referring to FIG. 1A, typically a developer using an editor software program will create an XML document, generically illustrated in FIG. 1A as XML input/output data layer 110. XML I/O data layer 110 represents an XML document that can be used via block 130 to create an object model 120. As described in the above-referenced patent, modifications can be made to the object model 120 which are also synchronized with the XML I/O data layer 110 (this is why the XML is referred to as both "input" and "output" with reference to element 110).

The editor software parses the document and builds a DOM tree comprising nodes 132, 136, 138, and 142. In order to render a display view of the XML file, the DOM tree is translated to convert it to the object model 120. This allows the object model 120 to be, for example, rendered and displayed to a user through an appropriate graphical user interface (GUI).

Block 130 comprises the mechanism for translating the object model from the DOM and for synchronizing the object model and DOM to each other. The mechanism of block 130 comprises, in addition to the DOM tree, a plurality of DOM/object model adapters 134, 140, and 144 which perform both the translation and synchronization process. Since they are handling both the translation and synchronization process, each adaptor is an instance of a separately coded type that must be specific to the corresponding model object and XML tag names.

When an XML document is opened and parsed, the software builds the particular DOM/object model adapters for the particular nodes of the DOM tree. The manner in which the DOM/object model adapters are built is known in the art and is not described further herein. Each adapter registers with the DOM node(s) and their corresponding object, to be notified when changes are made to the DOM nodes or object model properties for which it is responsible. During the process of editing, whether editing the object model on the display side or editing the DOM node on the source side, when a change is made, the corresponding adapter, upon notification, reflects the change to the corresponding object model or DOM node(s), respectively. If the particular edit results in any object model property or DOM tree node being added, the corresponding adapter is built and the corresponding object or DOM node is populated. In this manner, changes made in the source view are immediately reflected to the display view and vice-versa without the need to serialize and re-parse the XML document. Additional detail regarding the elements of FIG. 1A as set forth below in the discussion of FIG. 1B.

Figure 1B:
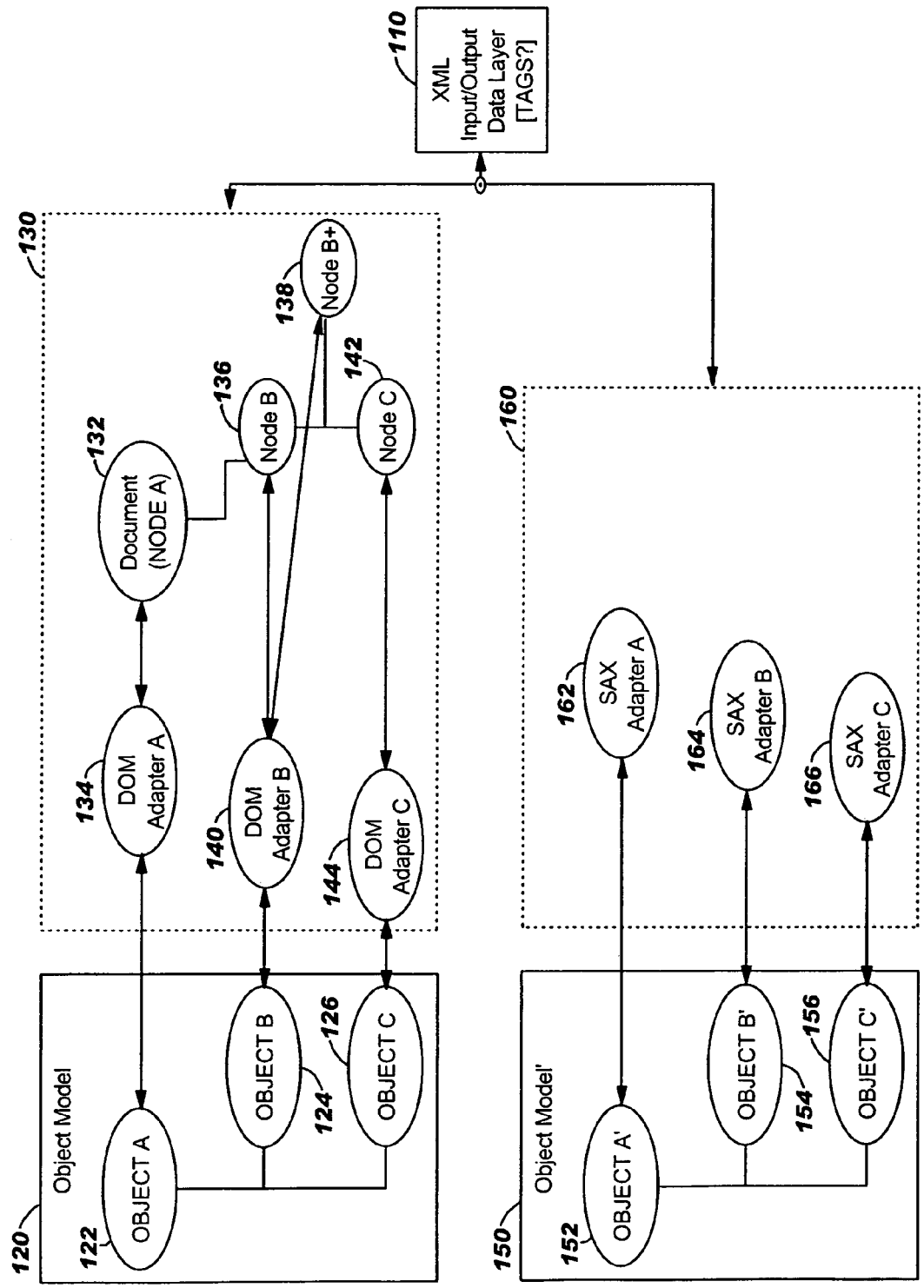
FIG. 1B illustrates the previously-described process whereby a first object model is rendered using a first procedure (a DOM process for use during runtime), and also a second process to build an object model' via a SAX mechanism.

FIG. 1B illustrates the previously-described process whereby a first object model 120 is rendered using a first procedure (a DOM process for use during runtime), and also a second process to build an object model' 150 via a SAX mechanism 160. As illustrated in FIG. 1B, in addition to the method illustrated in FIG. 1A, the FIG. 1B illustration also includes the creation of object model' using SAX adapters. The SAX adapters facilitate the translation/mapping of each event to the appropriate feature of the object model and the processing of SAX events to populate the object model. Drawbacks to this method are described above and are not repeated herein. As can be seen, the two implementations run in parallel with no "cooperation" beyond the initial XML coding.

Not shown in FIG. 1B is the XML DOM parser which reads the XML document and forms the DOM tree, nor the SAX parser that fires the events. Both of these elements are well known, and thus they are not illustrated herein.

DOM Node A, DOM Node B, and DOM Node C elements (items 132, 136, and 142, respectively) represent Nodes or "entities" from the DOM tree. DOM Adapters A-C (items 134, 140, and 144, respectively) are two way adapters, with domain specific code, that "listen" for changes to the DOM nodes and the model objects. Model Objects A-C (items 122, 124, and 126, respectively) represent model objects constructed from the values in the DOM nodes. These are part of the user specific semantic domain model used for application development. In FIG. 1B, DOM node B+ (item 138) represents a "leaf" node in the tree, that maps to a simple attribute of object B (for example, the "city" attribute of "Address", as described above). In this case, the same adaptor that listens to Node B can also listen for changes to Node B+ and update the changes to the attribute on object B accordingly.

As noted above, the SAX parser and a handler implementation are not illustrated in FIG. 1B. The handler implementation creates the "readers" with which the tags from the SAX events are interpreted in order to create and set values for objects in the object model. Readers A-C (items 162, 164, and 166, respectively) of SAX mechanism 160 are domain specific readers that "know" the correlation between the tags and the object models. In this simple embodiment, the handler processes the SAX events and performs simple "if-else" checks on the values of the tags in the event, and executes statically compiled code, as opposed to dynamic feature mapping based code, to create and set values for objects in the object model.

Figure 2:
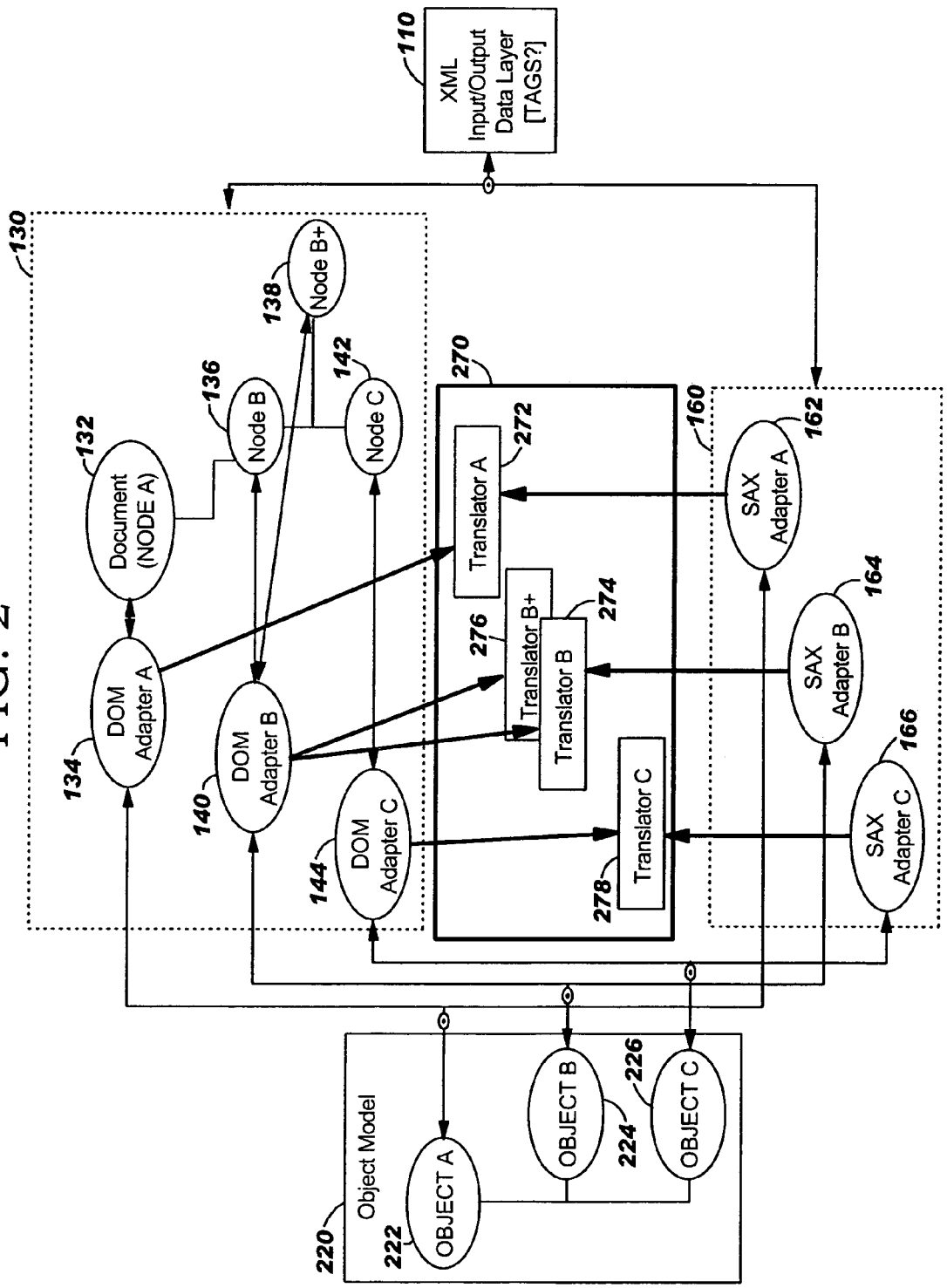
FIG. 2 is a block diagram illustrating the method and system of the present invention, whereby a translation block is employed to embody the rules for translation.

FIG. 2 is a block diagram illustrating the method and system of the present invention, whereby a translation block 270 is employed to embody the rules for translation. All of the rules for translation are embodied into a set of objects (the Translator) that can be reused in multiple contexts (e.g., DOM, SAX, or others) to create specialized "Renderers" that take advantage of these Translators and create adapters as needed. As described above, the translation of the XML to an object model, previously performed solely by the adaptors illustrated in FIGS. 1A and 1B, involves, in the prior art, the mapping of each individual XML tag name to a structural feature of the object model, in the DOM case, or involves the hand coding of event processing for each tag, in the SAX case. In accordance with the present invention, a separate translation block 270 is provided to isolate the translation function and thus allow this function to be generic, that is, it is accomplished in the same way for all implementations, using the same set of Translators. Thus, one set of Translators can be defined for a given XML meta model mapped to an object model meta model, and this set of Translators can be shared by any Renderer implementation. As can be seen in FIG. 2, the translation block 270 includes, in this example, a first Translator 272 (Translator A), a second Translator 274 (Translator B), a third Translator 276 (Translator B+), and a fourth Translator 278 (Translator C). For very simple map- pings, the Translator can be "generic", in that it is not a specialized class and contains the simple mapping from tag name to a feature; for more complex mappings, the Translator can be specialized, with overridden methods for executing the translation logic. In either case, the Translator is reusable by any Renderer/parser implementation pair.

Figure 3:
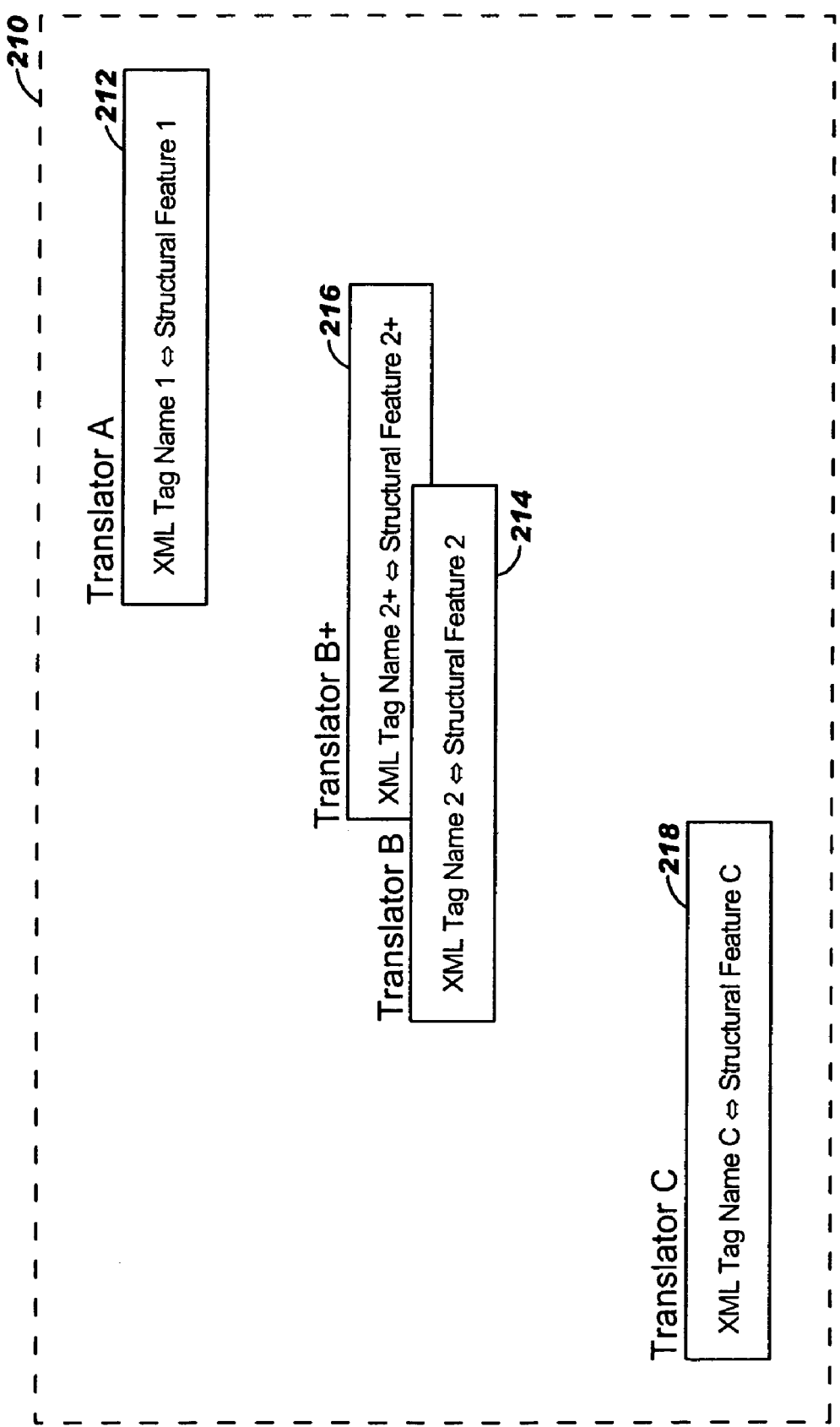
FIG. 3 illustrates an enlarged view of translation block.

FIG. 3 illustrates an enlarged view of translation block 270. As can be seen in FIG. 3, each Translator links an XML tag name with a structural feature. Thus, for example, when an XML tag name is called out, regardless of which process is being utilized, the link will always be the same, and the results provided to the rendering in the object model will also be the same. Since there is an individual Translator for each XML tag name, the system provides a great deal of flexibility with respect to modifications. Each XML can be individually changed if needed, and a single change to the Translator affects all processes (DOM, SAX, etc.).

Figure 4A:
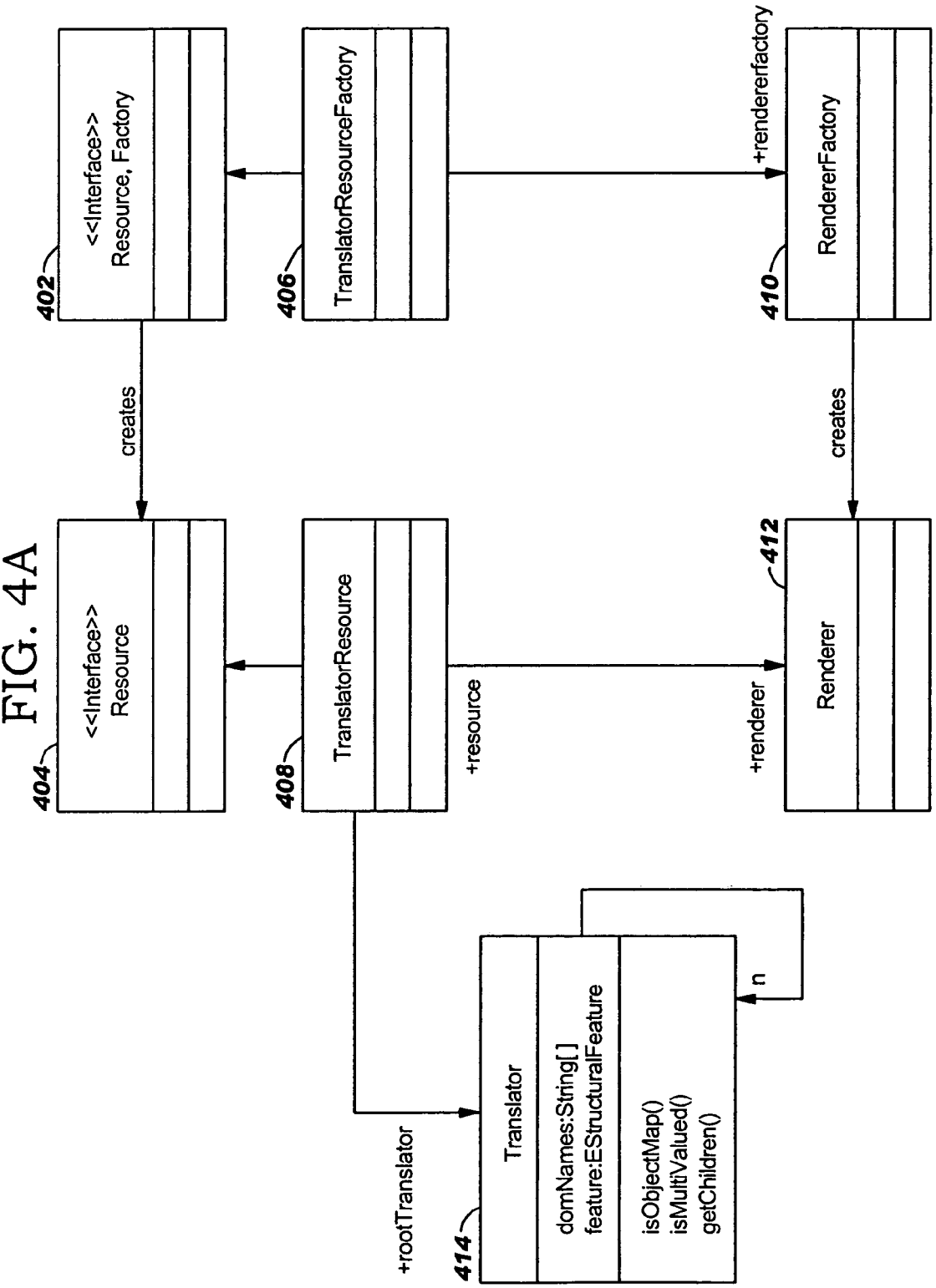
FIG. 4A illustrates an implementation of an embodiment of the present invention.

FIG. 4A illustrates an implementation embodiment of the present invention. FIG. 4A is a UML diagram that describes objects in an object oriented system, used to implement a framework for using Translators in accordance with the present invention. Referring to FIG. 4A, object 402 is a Resource factory that is used to create Resources. The Resource factory is defined as an interface, which may be implemented by classes for creation of specialized Resources. It includes one method, "createResource( )". Resource factories can be registered, by file name, URL, or otherwise, into a registry to be used at runtime; thus, when a request to load a Resource is issued, the Resource factory for that Resource will be retrieved and used to create the Resource. For example, a Resource factory named "EJBResourceFactory" can be registered for files named "ejb-jar.xml", and whenever a request to load a file with this name is issued, the EJBResourceFactory will be used.

Object 404 illustrates a Resource created by Resource factory 402. The Resource illustrated by object 404 is also an interface. Resources represent the containers for object model contents. The object model contents are populated from documents or files on disk, usually but not necessarily in XML format. Resource factories and Resources are well known in the art, as demonstrated by the Eclipse Modeling Framework (EMF). The embodiment described in FIG. 4A builds on these known concepts to create a layer of abstraction for the Translators, as described below.

Object 406 illustrates a Translator Resource factory. The Translator Resource factory is a specialized Resource factory that creates Translator Resources. The Translator Resource factory is also associated with one Renderer factory (object 410, described below).

Object 408 illustrates a Translator Resource, which is a specialized form of Resource. Translator Resource object 408 "knows" or contains information about Translators that are used as part of the present invention for object model-to-XML conversion, and vice versa.

Object 410 illustrates a Renderer factory associated with Translator Resource factory 406. The Renderer factory is responsible for creating the parser-specific Renderer implementation to be used by a created Resource for loading and saving. For example, the Renderer factory 410 can contain a public method, "createRenderer( )", which is used to create a Renderer for a given Resource. Separating the Renderer factory from the Translator Resource factory allows the same Translator Resource factory to be used to create Resources with different Renderer implementations. Thus, the Renderer factory is a "pluggable" element.

Object 412 illustrates a Renderer. The Renderer maintains responsibility for doing the actual rendering of the XML document, or the object model, depending on whether the Resource is being saved, or loaded, respectively. It contains references to parser-specific code for loading and saving XML files. The Renderer uses the Translators associated with a Resource for carrying out the conversions and rendering.

Object 414 illustrates a Translator. The Translator encapsulates the rules for converting object model features to XML, and vice versa. As shown in 414, the Translator contains one or more "domNames", or XML tags, and a "feature", described in the background as a meta model attribute or association in the object model. Thus, the Translator, in its simplest form, is a mapping between an XML tag and an object model feature. The Translator also contains behavior related to actually converting the object model to XML, and vice versa, using the meta model meta data. Translators can be specialized, or subclassed, to add additional custom behavior. A Translator Resource knows about one "root Translator" that will subsequently point to a collection of N "children" Translators (shown by association 416), thus forming a Translator tree that bridges the object model tree to an XML structure.

Figure 6:
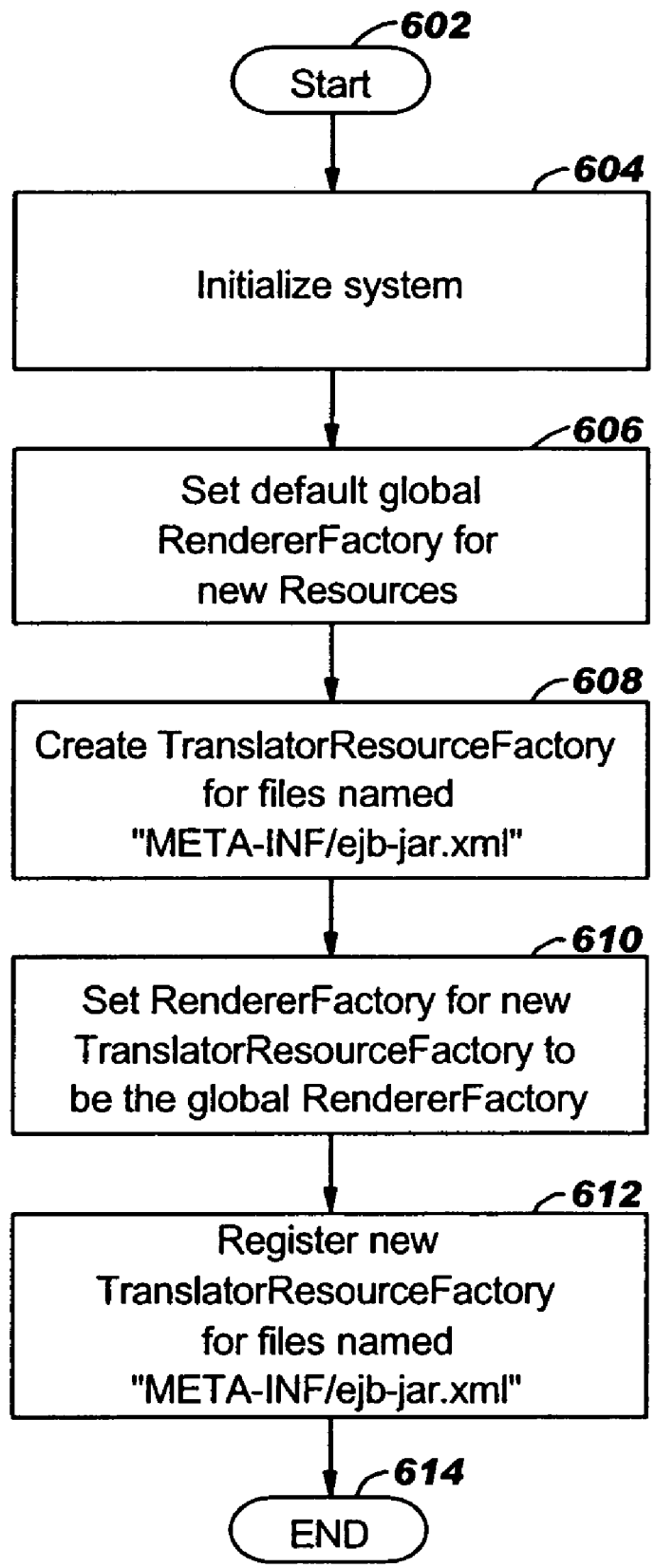
FIG. 6 is a flowchart illustrating an initialization process in accordance with the present invention.
Figure 7:
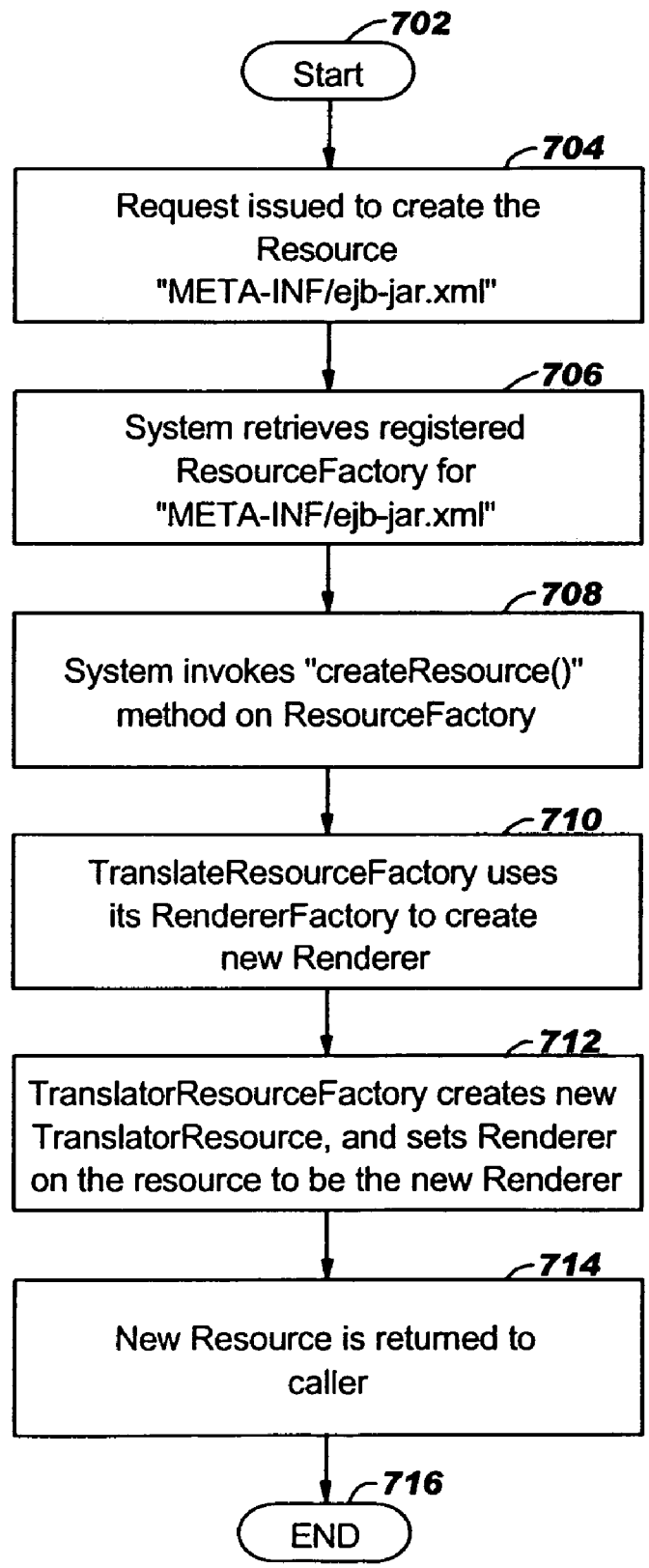
FIG. 7 is a flow diagram illustrating the creation of a Resource in accordance with the present invention.

Thus, as described in more detail in FIGS. 6 and 7, the objects in FIG. 4A comprise a framework that can be used to load and save XML documents to/from an object model in accordance with the present invention. Resource 404 is a top level container object that represents the in-memory representation of an object model, like the object model 220 shown in FIG. 2. The specialized Resource, Translator Resource 408, contains a link to a plurality of Translators, like the translation block 270, starting with a top level or "root" translator. The Translator Resource delegates the actual "rendering", to the Renderer object 412. The Renderer object 12 will use the Translators, along with XML parser specific APIs to carry out the loading and saving of the documents. Resource Factory 402, Translator Resource Factory 406, and Renderer Factory 410 provide a dynamic, flexible framework for creating specialized Resources based on the name of the XML file being handled. Each Resource created will be associated with a parser specific Renderer as created by the Renderer Factory associated with the registered Translator Resource Factory.

Figure 4C:
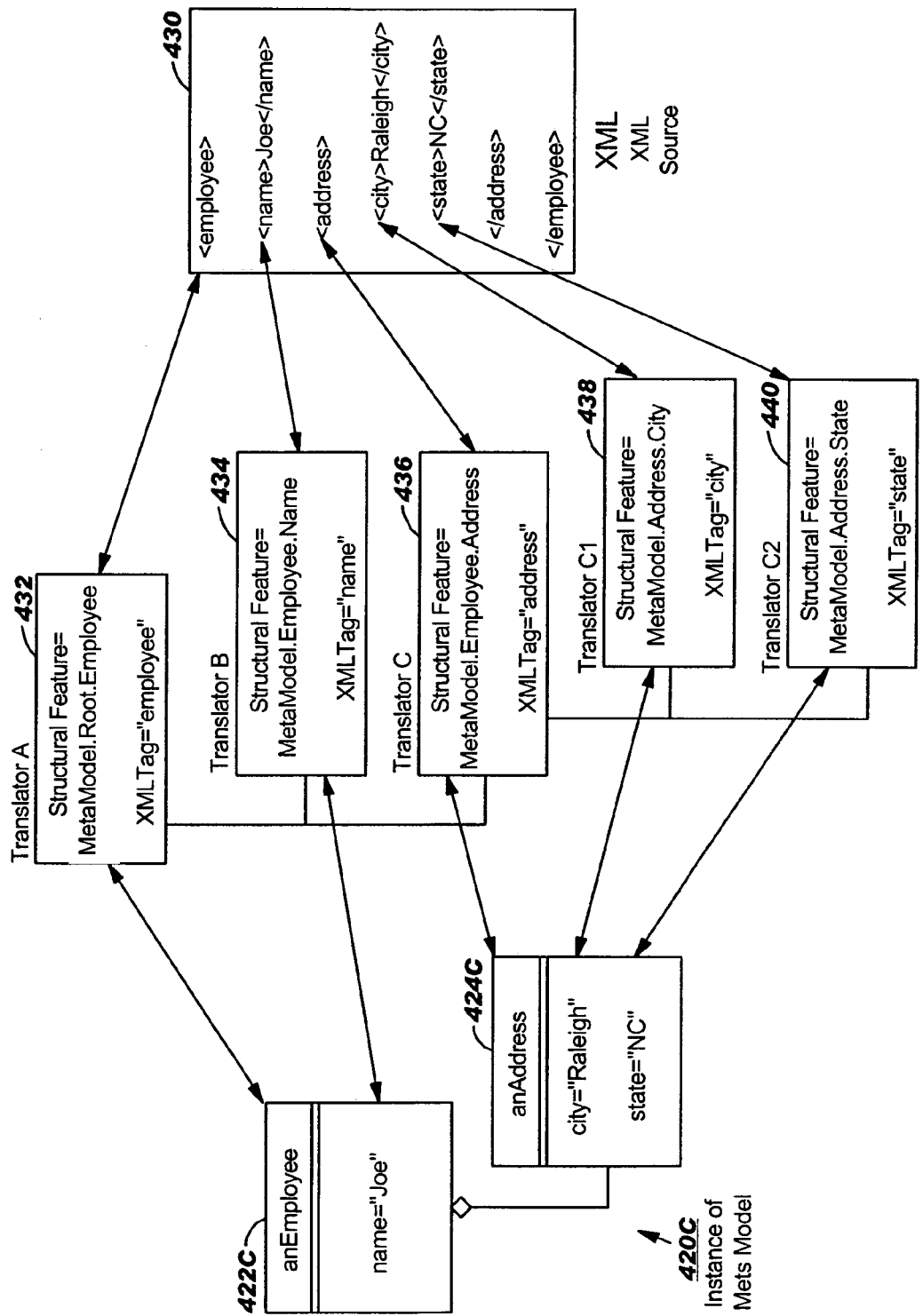

FIGS. 4B and 4C illustrate an example model in accordance with the present invention. More particularly, and as described in more detail below, FIGS. 4B and 4C illustrate a sample object model for an application. A sample "snippet" of XML code is the rendering of the XML based on the object model instances shown in the Figures. Also illustrated are corresponding Translator instances, containing the object model to XML mappings, shown as a tree structure. It is noted that the Translators are "stateless", that is, no conversational state is maintained. The objects are created once for each mapping and are used for all load and save requests.

FIG. 4B shows the meta model 420, or description of the objects in the system. Two objects Employee (422) and Address (424), are illustrated. An Employee has a "name" attribute, and contains one Address. An Address contains attributes "city" and "state". Within the meta model, each of Employee.Name, Employee.Address, Addres.City, and Address.State, is described as a structural feature, or feature for short, as described in the background of the invention.

FIG. 4C shows an actual instance of objects using object model 420, illustrated in FIG. 4C as 420C. It shows one instance of Employee (422C) where the value of the name attribute is "Joe". The Employee has an Address (424C), having values for city and state of "Raleigh", and "NC", respectively.

The rendered XML source 430 results from the use of the Translator structure to map the structural features from the Object model to the XML tags. Starting with Translator A (432), the "root" translator for the document, the structural feature indicating the root of the resource to the "Employee" object type maps to the "employee" XML tag. Translators B (434) and C (436) are "child" Translators of Translator A. Translator B contains a mapping for a simple attribute feature, the "name" feature of object "Employee". Because "name" is an attribute and not an object reference, Translator b does not itself have any children and is thus considered to be "managed by parent". Translator B will be used to get and set values for the name attribute of Employee object instances during load and save of XML instance files.

Translator C is a translator for the "address" feature of the Employee object. It maps this feature to the "address" XML tag, as shown in the diagram and in the XML source. Because the address feature maps to another object (the Address object", which itself contains features, Translator C contains child translators which thus map the Address features to XML tags.

Translators C1 (438) and C2 (440) are child Translators that handle the "city" and "state" features of the Address object. Because these features are simple attributes, C1 and C2 do not contain children.

In accordance with the present invention, when the XML source is loaded, a Translator Resource Factory (e.g., 406 of FIG. 4A) will be used to create a new Translator Resource (e.g., 408 of FIG. 4A). The Translator Resource will contain a reference to a "root" Translator, Translator A, and after loading, will contain a reference to the Employee instance object as its "contents". The Translator Resource will delegate the load to its associated Renderer (e.g., 412 of FIG. 4A), which will use the root Translator A, and all descendants of Translator A, to create the Employee and Address objects as shown in the instance model. The Renderer will perform the actual interaction with an XML parser implementation. Thus, FIGS. 4B and 4C show an example illustrating how the objects described in FIGS. 2, 3, and 4A are used to render an instance model from XML, or render XML from an instance model, in accordance with the present invention.

Figure 5:
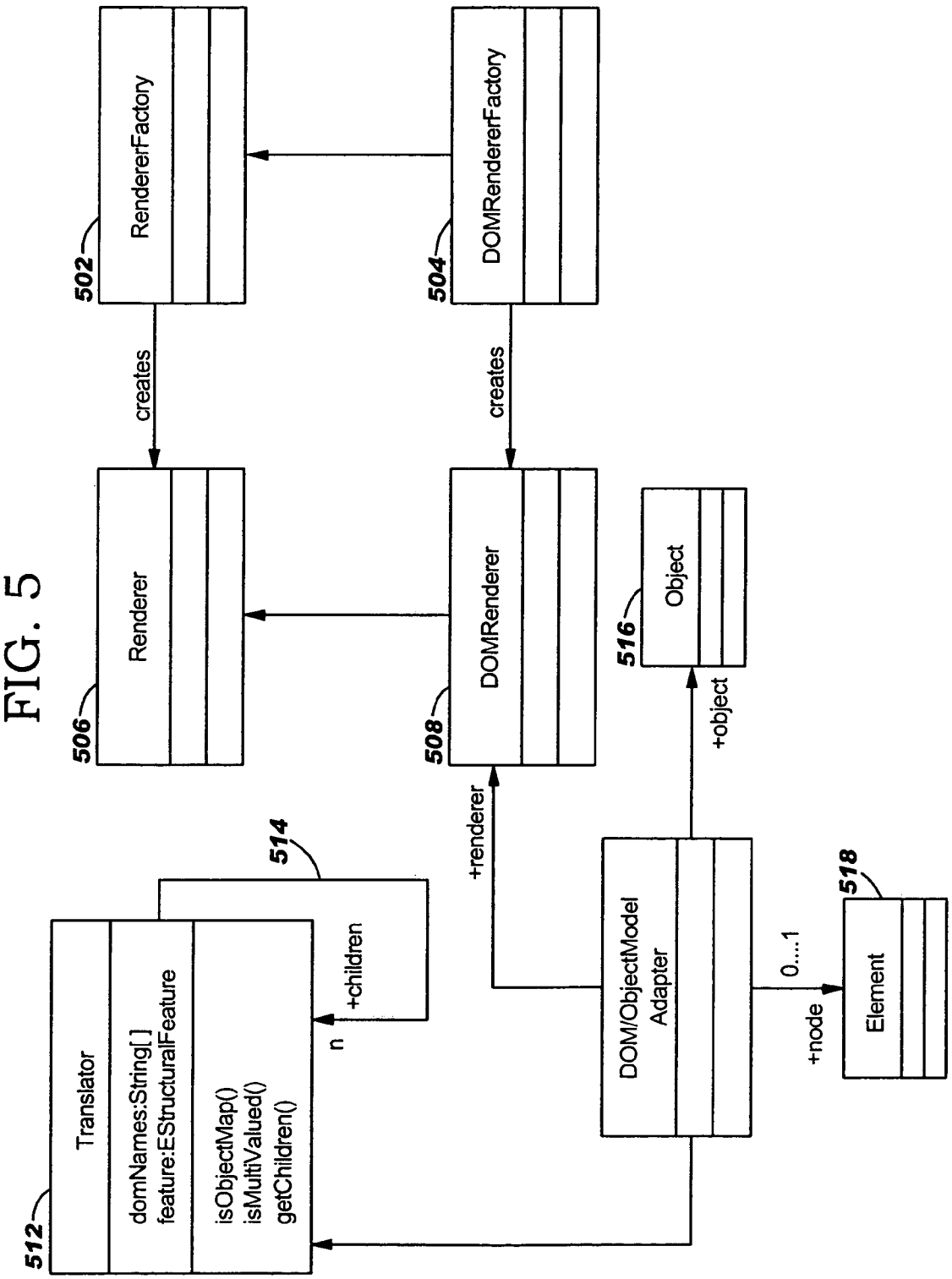
FIG. 5 is a UML diagram that describes objects in an object-oriented system, used to implement a DOM-based Renderer in accordance with a preferred embodiment of the present invention.

FIG. 5 is a UML diagram that describes objects in an object-oriented system, used to implement a DOM-based Renderer in accordance with the present invention. Referring to FIG. 5, objects 502 and 504 illustrate a Renderer factory and DOM Renderer factory, respectively. The DOM Renderer factory is a specialized type of Renderer factory, which is responsible for creating instances of a DOM Renderer (object 508, discussed more below). DOM Renderer factory 504 can be plugged into a Translator Resource factory, as shown by the link between Translator Resource Factor 406 and Renderer Factor 410 in FIG. 4 for ensuring that new Resources are loaded and saved using the DOM Renderer.

Objects 502 and 506 show the abstract relationship between a Renderer Factory and a Renderer, and DOM Renderer 508 is a specialized concrete Renderer created by the specialized concrete Renderer Factory DOM Renderer Factory 504. DOM Renderer 508 contains the DOM-specific code for using XML DOM parsers, reading and creating DOM nodes, and creating DOM/Object Model Adapters (item 510).

Object 510 is a DOM object model adapter. The DOM object model adapter is an adapter that sits between an XML element (object 518) and an object model object (object 516). This is similar to the DOM Adapters 134, 140, 144, shown in FIG. 1B. However, in accordance with the present invention, DOM object model adapter 510 is generic and does not contain specific mappings or translation code itself, like DOM Adapters 134, 140, and 144 in FIG. 1B or 2. Rather, that is delegated to its associated translator 512, like the Translators in translation block 270.

DOM object model adapter 510 is associated with Translator 512. Translator 512 is used to perform low level XML-to-object and object-to-XML conversions. As illustrated by association 514 (and as described with respect to FIG. 4, and as shown with respect to Translator B and Translator B+, items 274 and 276 in FIG. 2), a Translator can contain zero or more child Translators. This forms a tree of Translators, which mirrors a tree of XML elements and a tree of object model objects. Thus, for a given XML Entity that has child elements, the corresponding Translator will have child Translators that can translate the child elements to an object model. Object 516 is an object in an object model, like Object Model 220, and object 518 is an element or node in an XML DOM structure, like the items 132-142 depicted in FIG. 2. Thus, in accordance with a preferred embodiment of the present invention, and as described in further detail in the flowcharts of FIGS. 11 and 13, the objects in FIG. 5 comprise the components that can be used to construct a DOM Renderer implementation that uses the Translation block 270 to convert XML to an object model and vice versa.

FIG. 6 is a flowchart illustrating an initialization process in accordance with the present invention. In FIG. 6, during "startup" of the system, a Translator Resource Factory (e.g., 406 of FIG. 4A) is registered with a Renderer Factory (e.g., 410 of FIG. 4A), for an example XML file "META-INF/ejb-jar.xml. The initialization process described in FIG. 6 illustrates the preregistration of Resource factories and Renderer factories in anticipation of future requests to load Resources, in accordance with the present invention. The process begins at step 602, and at step 604, the initialization process is triggered as part of a normal start-up routine. This will vary depending on the environment. For example, an application server may have a well-defined start-up sequence, whereas an IDE may utilize a "load when needed" approach to the start up of a plug-in.

At step 604, during the start-up process, the global Renderer factory is defaulted. This is the mechanism for determining which form of Renderers (e.g., SAX, DOM, or other form) will be used for loading and saving the Resource and performing XML-to-object model conversion. In a preferred embodiment, a Renderer factory need not be global, but can be scoped, or isolated, to a given set of Resources such that different Renderer factories can be registered for different sets of Resources. For example, "projects" in an IDE may load resources using DOM Renderers, while "archives" being imported into the IDE may use SAX Renderers. Also in a preferred embodiment, different Renderer factories can be registered based on context, system state, project content (where "project" is defined as a collection of files in an IDE), module content (where a "module" is defined as a collection of files composing an application in a running server), or any other variable set of criteria that may be used to derive a Renderer. For example, a Renderer factory may be dynamically determined based on "context" or system state (e.g., UI, non-UI, etc.).

At step 608, a Translator Resource factory is created for files named "META-INF/ejb-jar.xml". As shown in the object model diagrams (FIGS. 4A and 5), the Translator Resource factory is the object responsible for creating Translator Resources, which use a Renderer for loading and saving. In a preferred embodiment, the steps illustrated in FIG. 6 will be repeated for every XML Resource type that uses the Translator mechanism in accordance with the present invention; for example, for all of the "deployment descriptor" files as defined by the J2EE specification.

At step 610, the Renderer factory for the new Translator Resource factory created at step 608 is set to be the "global" Renderer factory (as an example, assume that the global factory will default based on some external system setting, e.g., an environment variable). Thus, whenever this Translator Resource factory is used to create a new Resource, it will then use that Renderer factory to also create a corresponding Renderer.

At step 612, the new Translator Resource factory is registered for all files named, in this example, "META-INF/ejb-jar.xml". Thus, whenever a request is made to create Resources with this name, the registered Translator Resource factory will be retrieved and used for Resource creation. It is noted that, while a specific file name is illustrated above, any file name can be utilized and fall within the scope of the present invention. Finally, at step 614, the initialization process is complete. Thus, in accordance with the present invention, the system is now initialized such that when a request is made to create, load, or save a Resource, as described in further detail in FIGS. 7, 10, 11, 12, and 13, a Translator Resource Factory (e.g., 406 of FIG. 4A), registered based on file name, will be used to create the Resource. The Renderer Factory (e.g., 410 of FIG. 4A) associated with the Translator Resource Factory will be used to create a specific Renderer, which will use the Translators associated with the new Resource, along with parser specific APIs, for XML to object model conversion.

FIG. 7 is a flow diagram illustrating the creation of a Resource in accordance with the present invention. The process begins at step 702, and at step 704, a request is issued to create the example Resource "META-INF/ejb-jar.xml". At step 706, the system retrieves the registered Resource factory. This Resource factory will be a Translator Resource factory.

At step 708, the Translator Resource factory receives the createResource( ) method call. This instructs the factory to create a new Resource. At step 710, the Translator Resource factory uses its associated Renderer factory to create a new Renderer. As shown in FIG. 6, the Renderer factory was associated with this Resource factory during initialization.

At step 712, the Translator Resource factory creates a new Translator Resource, and sets its Renderer to be the new Renderer just created. Thus, when the Resource receives a method call to "load" or "save", it will delegate the process to its Renderer, which will actually perform the implementation-specific work of converting the object model to XML and/or using a specific XML parser implementation.

At step 714, the new resource is returned to the calling object that requested the creation (step 704), and at step 716, the process ends. Thus, FIG. 7 describes the interaction of the objects in FIG. 4A, such that a new Translator Resource is associated with a Renderer, which it will use for loading and saving from and to XML.

Figure 8:
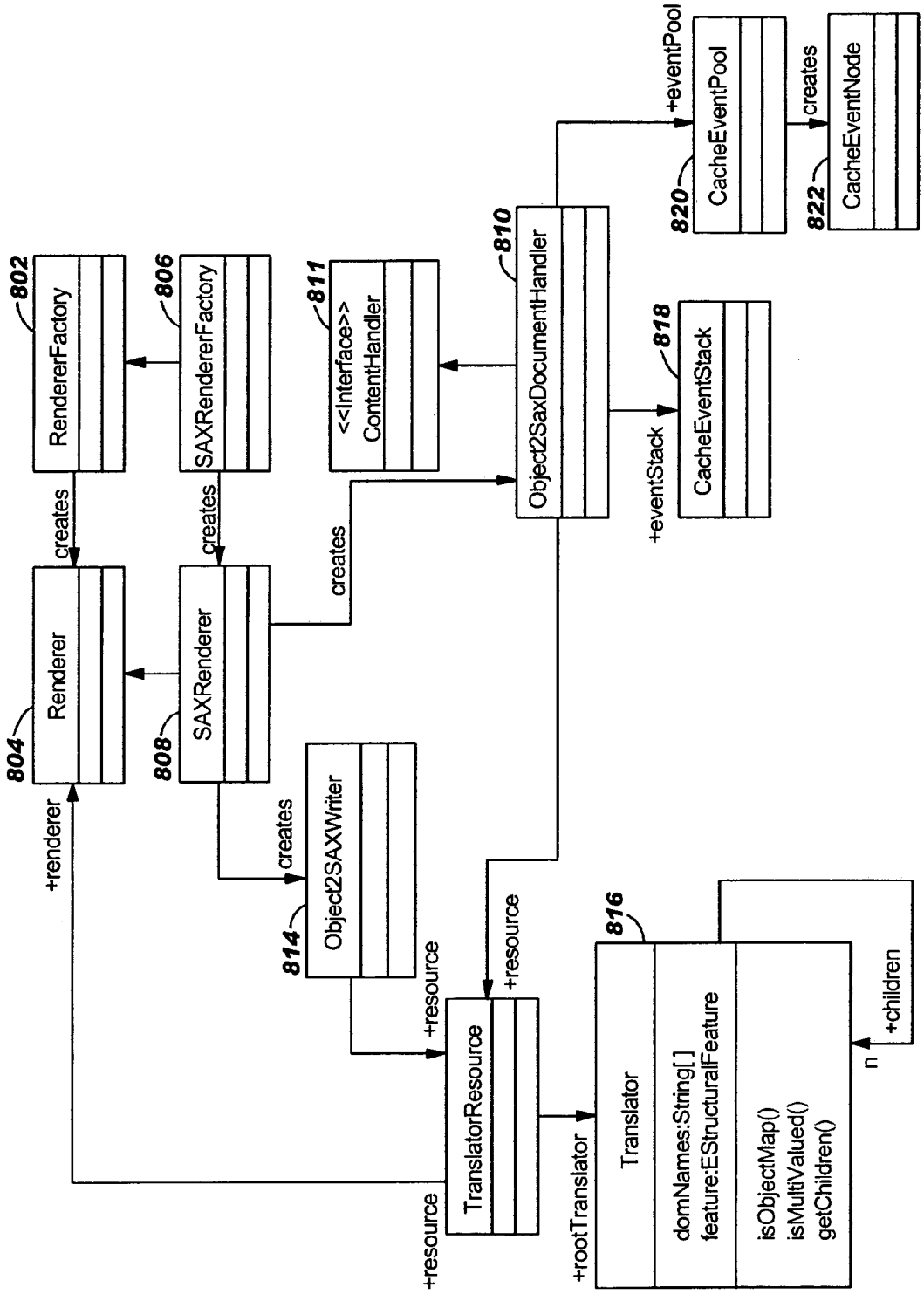
FIG. 8 is a UML diagram that describes objects in an object oriented system, used to implement a SAX-based Renderer in accordance with a preferred embodiment of the present invention.

FIG. 8 is a UML diagram that describes objects in an object oriented system, used to implement a SAX-based Renderer in accordance with a preferred embodiment of the present invention.

SAX Renderer 808 is a specialized type of Renderer 804, embodying the SAX parser specific API references. The SAX Renderer 808 uses the Simple API for XML (SAX) to read XML documents. SAX is an event-based parsing mechanism which announces the beginning element, contained data, and ending element for each XML document. Those of ordinary skill in the art are familiar with the SAX APIs, and are familiar with SAX events.

The Object2 SAX Document Handler 810 implements the Content Handler interface 811 which receives events from the SAX parser. The Object2 SAX Document Handler 810 object uses the Cache Event XXX objects to parse the XML document. Each Cache Event Node contains information about the SAX event. This information includes the corresponding Translator that should be used to coordinate the rendering to/from the objectmodel, the attributes associated with the XML node from the document, and the actual content of the XML node.

The SAX Renderer uses a very different kind of adapter to utilize the Translator 816. The Cache Event Node 822 coordinates the SAX events with a specific XML element, its content and attributes and the corresponding Translator 816. Note that this is the same Translator 816 used in DOM, but constructed in a different paradigm. Each Cache Event Node 822 is created when a SAX "start Element" event is received. The Translator 816 is invoked to create a model object, if necessary, and the top Cache Event Node is accessible if a parent object is required. The Cache Event Node is then pushed onto a stack to buffer data as it arrives. Any new XML elements announced are pushed onto the Cache Event Stack 818 in the same manner. When an endElement event is received, the top Cache Event Node is popped off, and the Translator is invoked to close and complete the population of the model object. The Cache Event Pool 820 is an auxiliary object created to re-use existing (empty) instances of Cache Event Nodes 822 for performance purposes to avoid excessive object creation and garbage collection.

The Object2 SAX Writer 814 uses the Translators 816 to understand the Object model, and announces the XML elements and content to a Stream Writer that can output the data in a textual format.

A Translator 816 is associated with each Cache Event Node 822. The Translators 816 are built to understand the structure of the documents are designed to process, which means that no further information is required from the Cache Event Nodes to known which Translator to create when events are received from the SAX parser. It uses the Translator to perform the low level XML to Object and Object to XML conversions.

Figure 9:
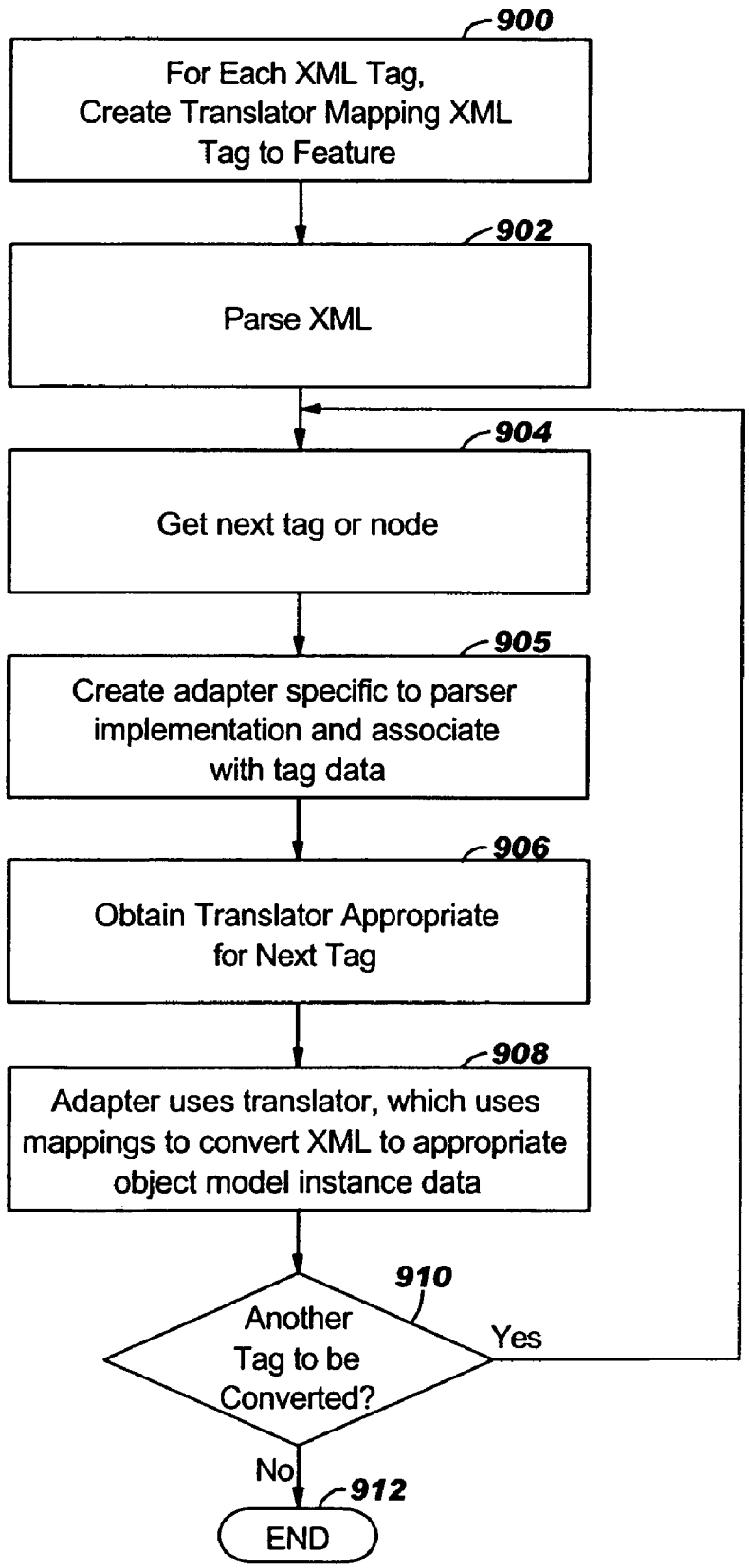
FIG. 9 is a simplified flowchart illustrating, at a high level, the steps performed in the process of conversion of XML into an object model in accordance with the present invention.

FIG. 9 is a simplified flowchart illustrating, at a high level, the steps performed in the process of conversion of XML into an object model in accordance with the present invention. At step 900, a Translator is created for each XML tag associated with a feature of the object model to be created. There will be a translator for all XML tags defined by the XML meta data (e.g., XSD or DTD). But the Translator does not necessarily have to map to a feature. In most cases it will. However, in cases where a custom Translator is used, special code may be used to execute the translation rules for that particular XML tag.

Those XML tags that do generate a feature in the object model are mapped to that feature, and the mapping is stored as a Translator in a Translator registry. Within the registry, a "root Translator" is associated with each Resource type (e.g., resources for type "ejb-jar.xml" will be associated with an "EJBJARRootTranslator" object). The creation of Translators and mappings is done only once, "on demand", or the first time they are requested. Thereafter they are cached in memory for any subsequent loads or saves.

At step 902, a parser parses the XML in a known manner, and each tag requiring conversion is identified at step 904. At step 905, the parser specific adapter object is created and associated with the tag data from the parser.

At step 906, the adapter accesses the translation block and obtains the appropriate Translator for the first (or next) tag from the tags identified in step 904. At step 908, the adapter uses the Translator to create and set values on the object model, and uses the mapping information or custom code to execute the translation and set values accordingly.

Since the Translator contains generic information regarding the mapping of a tag to a feature, it makes no difference whether the parsing is being performed using a DOM tree or a SAX API. The existence of a DOM tree or events (SAX API) that correspond to the different feature found in the parsed XML document is of no consequence to the Translator; all it need "know" is that the tag being processed is associated with the particular feature, not whether a particular object node or event is associated with the feature. Thus, the translation block of the present invention enables the use of any kind of parsing standard in connection with the conversion of XML to the object model.

At step 910, a determination is made as to whether or not there are additional tags to be converted. If there are, the process reverts back to step 904, and the next tag is processed. If not, the process proceeds to step 912 and terminates.

Figure 10:
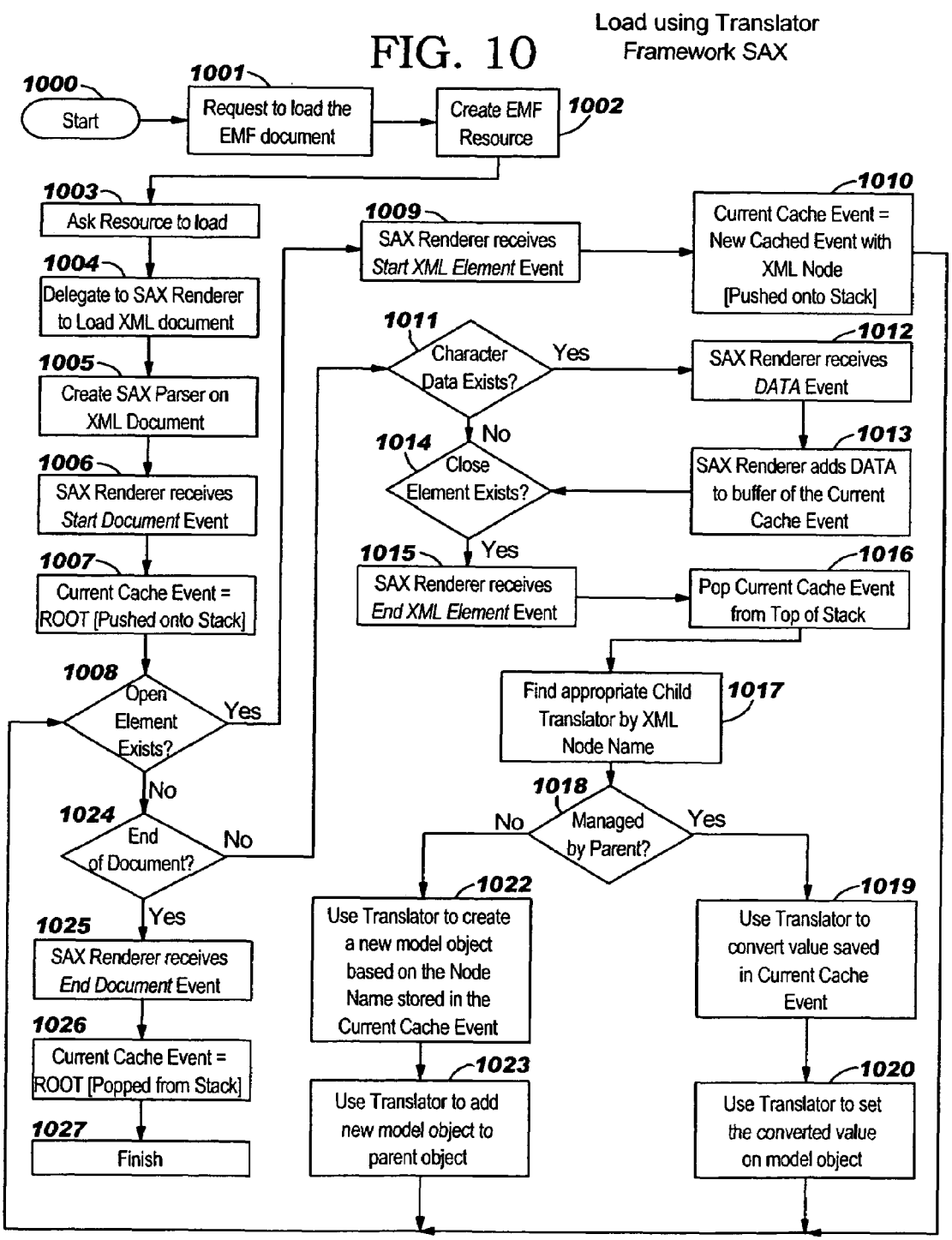
FIG. 10 is a flowchart illustrating the process for loading XML documents using a SAX Renderer implementation as shown in FIG. 8, along with a SAX parser, in accordance with a preferred embodiment of the present invention.

FIG. 10 is a flowchart illustrating the process for loading XML documents using a SAX Renderer implementation as shown in FIG. 8, along with a SAX parser, in accordance with a preferred embodiment of the present invention. The process begins at step 1000, and at step 1001, a request is issued to load a Resource. As described in FIG. 4, a Resource in the context of the present invention is an object that represents the contents of the object model corresponding to a given XML document. At step 1002, a Resource is created (see FIG. 6). At step 1003, a request is made to the created Resource to load, and the Resource delegates the request to its Renderer (step 1004). For example, a SAX Renderer will use a SAX parser to parse an XML document, receive events, and populate the object model. At step 1005, a SAX parser is created from the XML document. This can be done using well-known APIs to create an "input source" for the XML document, and from this the SAX parser is created. The SAX parser is then given the "parse( )" command, which causes the input source to be scanned and parsed, thus firing "events" to a SAX handler.

At step 1006, the SAX Renderer receives the "start document" event from the SAX parser. As is well known, a SAX parser requires a handler and fires SAX events. As shown in FIG. 8, the SAX Renderer uses an Object2 SAX Document Handler, which will thus receive events from the parser.

At step 1007, the current cache event is set to equal "root", which pushes the current cache event onto the stack. In many cases, an event can be processed immediately when a tag is encountered. In some cases, however, more information is necessary to do the translation, and this information is in tags that occur further down in the document. In such cases, the processing of the tag is deferred until all needed information has been obtained. Thus, a "cache event" is created and added to the stack for deferred processing.

At step 1008, a determination is made as to whether or not an open element exists, which indicates the beginning of an XML document. If it is determined that no open element exists, then the process proceeds to step 1024, where a determination is made as to whether or not the end of the XML document has been reached. If, at step 1024, it is determined that the end of the document has been reached, the process proceeds to step 1025, where the SAX Renderer receives the "end document" event and then proceeds to step 1026 where the current cache event is set to equal "root". At the termination of the document, as with the termination of an XML element, the current cache event is popped from the stack, effectively completing the process of the XML element and its content. The process then proceeds to step 1027 where the process terminates.

If at step 1008, it is determined that an open element does exist, the process proceeds to step 1009, where the SAX Renderer receives the "start XML element" event from the parser. The process then proceeds to step 1010, where the current cache event is set to equal "new cached event with XML node", which is pushed onto the stack to maintain the current processing state of the document. Using a stack for processing recursive data is a standard technique within the art. The process then proceeds back to step 1008 to determine if another open element exists. If another open element exists, the sequence of steps 1009 and 1010 are repeated. If, at step 1008, it is determined that no open elements exist, and then if the process proceeds to step 1024 and it is determined that the end of the document has not been reached, then the process proceeds to step 1011, where a determination is made as to whether or not character data is available. The character data is just the textual content of the XML element. If, at step 1011, it is determined that no character data exists, the process proceeds to step 1014 where it is determined whether or not a close element exists. A close element is the logical terminating XML element for the current XML element being processed. If no close element is found, the SAX Parser will throw exceptions indicating that the document is invalid. If at step 1014 it is determined that a close element does exist, the process proceeds to step 1015, where the SAX Renderer receives the "end XML element" event and then the process proceeds to step 1016, where the current cache event is popped from the top of the stack. Popping the Cache Event Node off of the top of the stack effectively records that the element has been fully processed. The process then proceeds to step 1017, where the appropriate child Translator is found from the registry of predefined Translators. More particularly, the top-level Translator is cached with the top-level cache event, and the appropriate Translator for the XML node is found by searching through the child Translators, using the XML node name. The close element will always be present as this process assumes well-formed XML. If the XML were not well-formed, then the SAX Parser would have already raised an error.

The process then proceeds to step 1018, where a determination is made as to whether or not the child Translator is managed by the parent. "Managed by parent" is a boolean flag that describes whether the Translator represents the setting of a simple data type on an existing model object, or the creation of a child model object. A Translator that is managed by the parent will not have child Translators, and thus represents the mapping to a simple data type.

If at step 1018 it is determined that the child Translator is managed by the parent, then the process proceeds to step 1019, where the child Translator is used to convert the values saved in the current cache event. The process then proceeds to step 1020, where the child Translator is used to set the converted value on the model object. In the generic, simple case, the child Translator will use the meta-model information to perform a dynamic "setValue" operation on the model object, passing in the structural feature and the converted value to the model object. In the custom case, the child Translator will execute the custom code for setting the value. The process then proceeds to step 1008 and goes forward as described above.

If, at step 1018, it is determined that the child Translator is not managed by the parent, then the process proceeds to step 1022, where the child Translator, from step 1017, is used to create a new model object. The process then proceeds to step 1023 where the child Translator from step 1017 is used to add the new model to the parent object (the cache event will contain the parent) and then the process proceeds to step 1008 as described above.

If, at step 1011, it is determined that character data does exist, then the process proceeds to step 1012, where the SAX Renderer receives the "data" event, the process then proceeds to step 1013, where the SAX Renderer adds data to the buffer of the current cache event, and then the process proceeds to step 1014 and operates as described above.

Figure 11:
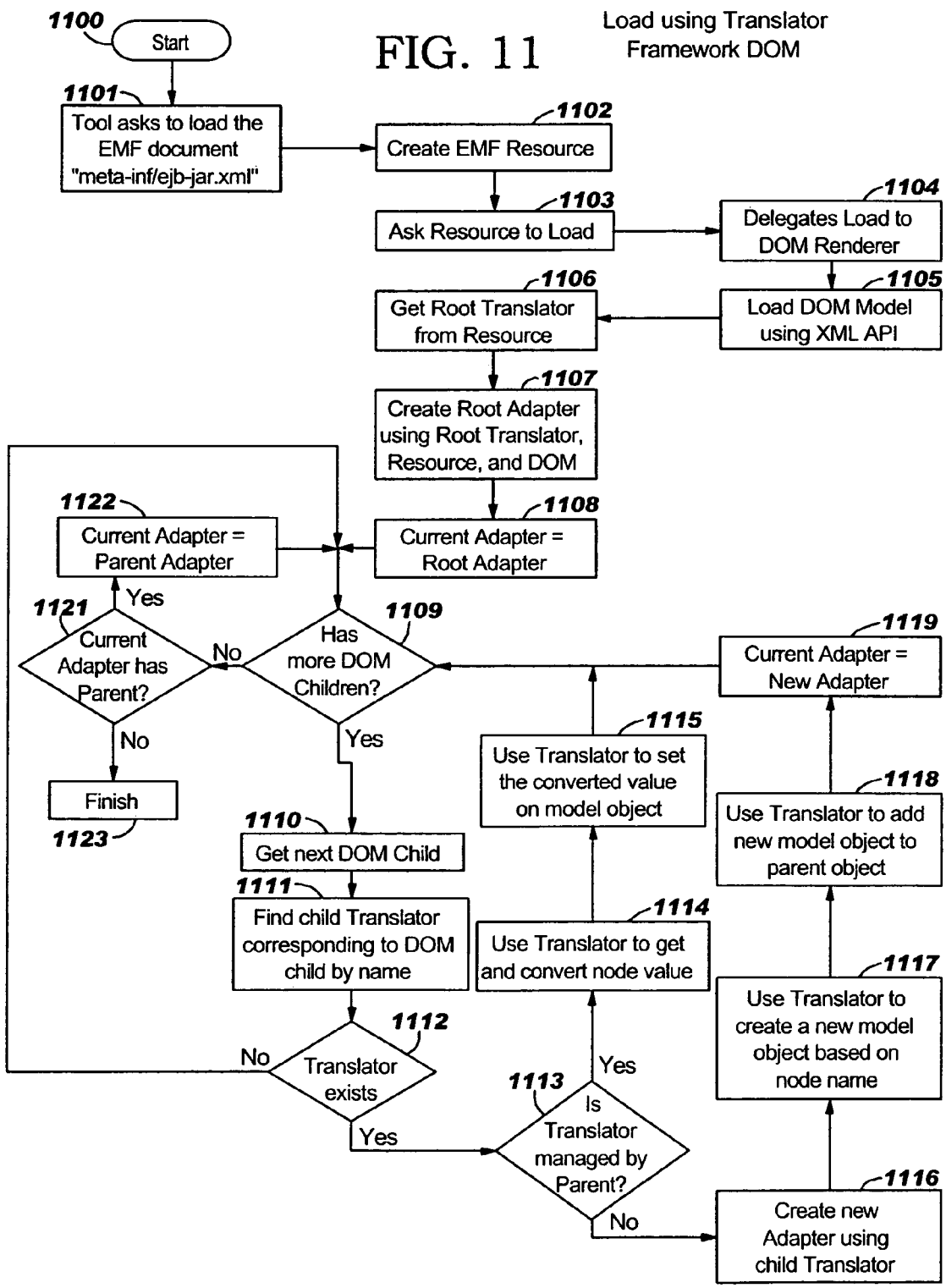
FIG. 11 illustrates the process for loading XML documents using the DOM Renderer implementation described in FIG. 5, along with a DOM parser, in accordance with a preferred embodiment of the present invention.

FIG. 11 illustrates the process for loading XML documents using the DOM Renderer implementation described in FIG. 5, along with a DOM parser, in accordance with a preferred embodiment of the present invention. At step 1100 the process begins. At step 1101 a request is issued to load the example Resource"META-INF/ejb-jar.xml". At step 1102 a Resource is created using the mechanism described in FIG. 7. At step 1103, a request is made asking the Resource to be loaded. At step 1104, the load is delegated to the DOM Renderer. At step 1105, the DOM model is loaded using a well-known API for loading an XML document into a DOM model. Those of ordinary skill in the art will appreciate the similarities of steps 1100-1104 and steps 1000-1004. The steps are virtually the same, with one small difference: in step 1004, for the SAX example, it is assumed that the "SAX" Renderer factory as described in FIG. 8, has been preregistered in the system for the file ejb-jar.xml. In step 1104, on the other hand, for the purpose of illustrating the use of the DOM Renderer, it is assumed that the "DOM" Renderer factory, as described in FIG. 5, has been preregistered. In both cases, when the request is made to load, the system must do two things: create the resource (as described in FIG. 7), then load it. As described in FIG. 7, the resource is created with the appropriate Renderer, and then the load is delegated to the Renderer.

At step 1106, the root Translator is retrieved from the Resource. At step 1107, the root adapter is created using the root Translator, Resource, and DOM Document. As shown in FIG. 5, the DOM/object model adapter contains a reference to its Translator and to the DOM node with which it is associated.

Since a tree traversal of the DOM object structure is being performed, it is necessary to keep track of the "current" adapter. At step 1108, the current adapter is set to equal the root adapter. For each adapter, its children must be visited, and the children's children must be visited, and so on, until there are no more children. At this time the process "unwinds" back to the parent. Recursion can be used to perform this process, and thus, when recursion is used, the "current" adapter is actually attached to the method stack.

The process then proceeds to step 1109, where a determination is made as to whether or not the Node associated with the current adapter (hereafter referred to as the "current node") has additional DOM children. As shown in FIG. 5, the current adapter is associated with a DOM node. The children of the DOM node are obtained and iterated. If the current node does not have more DOM children, the process proceeds to step 1121, where a determination is made as to whether or not the current adapter has a parent. This is done to determine if the process is at the top level node (which is the DOM document). If the process has reached the top level document, the process is complete because all children have been traversed.

If the current adapter does have a parent, the process proceeds to step 1122, where the current adapter is set to equal the parent adapter (the unwind step described above) and then the process proceeds back to step 1109. If at step 1121 it is determined that the current adapter does not have a parent, then the process proceeds to step 1123, where the process is completed.

If, at step 1109, it is determined that the current node has more DOM children, the process proceeds to step 1110, where the next DOM child is retrieved. At step 1111, the child Translator corresponding to the DOM child by name is obtained. As shown in FIG. 5, the current Translator contains a list of child Translators. The list of child Translators is searched, and the DOM name associated with the child Translator is compared to the DOM name of the current DOM child. In a preferred embodiment, the Translator can also maintain a look-up table mapping DOM names to the associated child Translators. The process then proceeds to step 1112, where a determination is made as to whether or not a Translator exists for the DOM name of the current node, as searched for in step 1111.

If a Translator does not exist, the process proceeds back to step 1109 to determine if there are more DOM children. If the XML document was parsed with a validating parser, and we know that the document conforms to the meta data rules defined by the DTD or XSD, then this path will usually not occur, as a translator should be defined for each known XML tag by the application developer. If, however, a non-validating parser was used, it is possible the document contains invalid data with unknown tags, in which case these tags are ignored, or alternatively, an error condition could be raised. For the purpose of this example illustration, the unrecognized tag is ignored.

If, at step 1112, it is determined that a child Translator does exist, then the process proceeds to step 1113, where a determination is made as to whether or not the Translator is managed by the parent. If the Translator is managed by the parent, the process proceeds to step 1114, where that Translator is used to convert the node value from a String to a data type appropriate for the object model feature (e.g., an Integer, a Date, etc.). In the basic case, the object model feature contains the meta data that can be used for the translator to perform a generic conversion. In the custom case, the Translator will contain custom code to execute the conversion. The process then proceeds to step 1115, where the Translator is used to set the converted value on the model object. In the basic case, the child Translator will use the meta-model information to perform a dynamic "setValue" operation on the model object, passing in the structural feature and the converted value. In the custom case, the child Translator will execute the custom code for setting the value. The process then proceeds back to step 1109 to determine if the XML node of the current adapter has more DOM children.

If, at step 1113, it is determined that the Translator is not managed by the parent, then at step 1116 a new adapter is created using the child Translator, and then the process proceeds to step 1117, where the Translator is used to create a new model object. The process then proceeds to step 1118, where the Translator is used to add the new model object to the parent object. In the simple case, the Translator can reflect the meta model information of the structural feature to "set" the value. In the case of a single value feature, the "set" operation is invoked on the parent object, passing the structural feature and the value. In the case of a many-valued feature, the "add" operation is invoked. In the case of a custom Translator, a custom "setValue" method can be implemented in the Translator. The process then proceeds to step 1119, where the current adapter is set to equal the new adapter, and then the process proceeds back to step 1109 for processing as described above.

Figure 12:
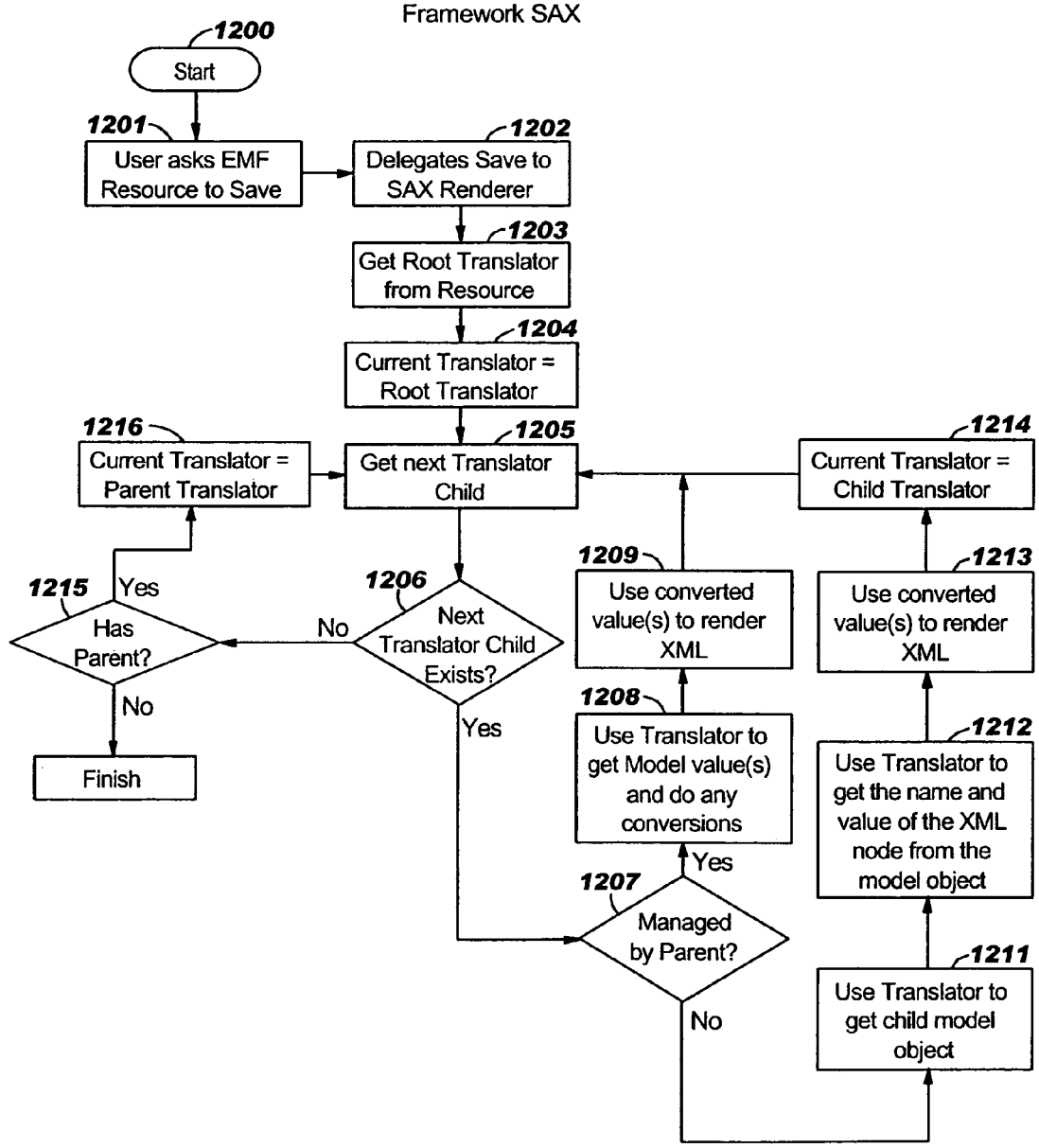
FIG. 12 illustrates the method of saving XML documents using the Translator format in accordance with the present invention, when using the SAX Renderer implementation described in FIG. 8.

FIG. 12 illustrates the method of saving XML documents using the Translator format in accordance with a preferred embodiment of the present invention, when using the SAX Renderer implementation described in FIG. 8. At step 1200, the process begins. At step 1201, a request is issued to save a Resource. This request can come from a variety of sources, for example, a user request to save an XML file in an editor in an integrated development environment (IDE). At step 1202, the save process is delegated to the SAX Renderer, and at step 1203, the root Translator is retrieved from the Resource, as described above with respect to FIG. 11. At step 1204, the current Translator is set to equal the root Translator. Because it is necessary to traverse the tree of Translators in order to render the contents of the XML document, the current Translator serves as an indicator of the position in the tree. In a recursive implementation, the current Translator is the translator parameter in the current method in the call stack, and at step 1205, the next Translator child is obtained. The list of child Translators is obtained from the current Translator, and an iterative process begins for each child Translator.

At step 1206, a determination is made as to whether or not there is another existing Translator child, i.e., whether the end of the list of children has been reached. If no next Translator child exists, the process proceeds to step 1215, where it is determined whether or not the current Translator has a parent. If at step 1215 it is determined that the current Translator does have a parent, the process proceeds to step 1216, where the current Translator is set to equal the parent Translator, and then the process proceeds back to step 1205. If at step 1215, it is determined that the current Translator has no parent, then this means that the current Translator is the root Translator, and all Translator children have been traversed. Therefore, the entire object model for the Resource has been traversed, and thus the process is completed.

If at step 1206, it is determined that a next Translator child does exist, the process proceeds to step 1207, where a determination is made as to whether or not the next Translator child is managed by a parent. If it is determined that the next Translator child is managed by a parent, then the process proceeds to step 1208, where the Translator child is used to get model values and do any conversions. The meta-model information of the Translator is used to convert the value of the feature on the object model to a string representation, to be serialized in the XML. In the case of a custom Translator, the "convertObjectToString( )" method can be overridden to execute custom logic to translate the object value to a string. The process then proceeds to step 1209, where the converted values are used to render XML, and then the process proceeds back to step 1205.

If at step 1207 it is determined that the next Translator child is not managed by a parent, the process proceeds to step 1211, where the Translator child is used to get the child model object. The meta model information in the structural feature associated with the child Translator is used to obtain the child model object. The process then proceeds to step 1212, where the Translator is used to get the name and value of the XML node from the model object. The Translator is associated with its XML node name. In most cases, this name is constant for a given Translator. There are some cases, however, where the same Translator may return different node names based on the type of the object. One example is the child nodes of the "enterprise-beans" element in the file EJB-JAR.XML, in accordance with the Enterprise JavaBeans™ specification (Sun Microsystems). Child elements may be either "entity" or "session".

The process then proceeds to step 1213 where the converted values are used to render the XML. At step 1214, the current Translator is set to equal the child Translator, and then the process proceeds back to step 1205, where the process repeats itself for the child model object and child Translator.

Finally, FIG. 13 illustrates the process of saving XML documents using the DOM Renderer implementation described in FIG. 5 in accordance with a preferred embodiment of the present invention. At step 1300, the process begins. At step 1301, a request is issued to save a Resource. At step 1302, the save process is delegated to the DOM Renderer, and at step 1303 a determination is made as to whether or not a DOM exists. The DOM may already exist in the case where this Resource was originally loaded from an XML document (as described in FIG. 11) and the DOM was created during the parse step, by the Renderer. If the DOM does not exist, this means that this is a "new" Resource with object model contents that were created but not yet saved to a document.

If a DOM does exist, then the process proceeds to step 1319, where the existing DOM is serialized to a file or other output medium, using well-known APIs for DOM serialization. It is assumed if the DOM exists that the DOM is synchronized with the contents of the object model, in accordance with the teachings of U.S. Pat. No. 6,745,208. The process then proceeds to step 1320 where the process is complete.

If, at step 1303, a determination is made that a DOM does not exist, the process proceeds to step 1304, where a root Translator is obtained from the Resource. At step 1305, a root adapter is created using the root Translator, the Resource and the DOM. Since no DOM exists, the Renderer first creates a new XML document instance. The document is the root level DOM node to be associated with the root Translator. Then, the root adapter is created.

At step 1306, the current adapter is set to equal the root adapter and at step 1307, the next Translator child is obtained, if any. At step 1308, a determination is made as to whether or not a next Translator child exists.

If, at step 1308, it is determined that no next Translator child exists, the process proceeds to step 1317, where a determination is made as to whether or not the current adapter has a parent. If the current adapter does have a parent, the process proceeds to step 1318, where the current adapter is set to equal the parent adapter. If, at step 1317, it is determined that the current adapter does not have a parent, the process proceeds to step 1319, where the existing DOM serialization functionality is used to perform the save operation as described above.

If, at step 1308, it is determined that a next Translator child does exist, the process proceeds to step 1309, where a determination is made as to whether or not it is managed by a parent. If it is managed by a parent, the process proceeds to step 1310, where the child Translator is used to get the model values and perform any conversions, and then the process proceeds to step 1311 where the converted values are used to render the XML, such that the adapter will set values on the node associated with the current adapter, and the process proceeds back to step 1307.

If, at step 1309, it is determined that the next Translator child is not managed by a parent, the process proceeds to step 1312, where the Translator is used to get a child model object, using the meta-model information from the structural feature associated with the child Translator. The process then proceeds to step 1313, where an adapter is created for each child object. Because the child object of the parent will be of a complex type, the object(s) need to also be adapted, and the process needs to be repeated for the child object(s). If the structural feature associated with the child Translator is single-valued, then there will be just one child object. If the structural feature is many-valued, then there will be zero or more child objects, in which case each child object is adapted.

The process then proceeds to step 1314, where a DOM node for the new adapter is created, using known APIs, and the process then proceeds to step 1315, where the current adapter is set to equal the new adapter created in step 1313, and then the process proceeds back to step 1307, where the child Translators associated with the new current adapter will be iterated, as described above.

Using the processes described above, preferred embodiments are shown for loading and saving object models as XML documents, using either SAX-based APIs or DOM-based APIs, in accordance with the present invention. In FIGS. 10 and 12, a SAX Renderer implementation is shown, and in FIGS. 11 and 13, a DOM Renderer implementation is shown. By using the Translators to separate the logic for model to XML conversion, this common logic is reused for both implementations. Application developers can use the present invention to create other Renderers as needed.

The present invention assumes that a meta model is being used, that is, a model that describes the object model and how the different objects in that model relate to one another. This is a well known method of prior art systems. Examples of such meta models include the EMF modeling framework and JavaBeans software componets. Thus, the Translator is basically a mapping between a tag name in XML and a feature of the meta model, along with associated behavior necessary to use the feature of the meta model to convert values to and from XML. As there is a meta-model that describes the object model, there is also XML meta-data that describes the form and tag names of the XML. This can be in the form of a DTD or XSD. As the system is designed, the mappings from XML to meta-model meta-data are encoded into Translator classes, either generic or custom, and generated either by hand or by an automated tool. When an XML file is processed and loaded into a "Resource", the root Translator is accessed. The very first time the Translators are requested for a Resource type (e.g., ejb-jar.xml), then the actual Translator instances are created from the encoded classes and cached in the system. In a preferred embodiment, unrecognized tags not already mapped can be processed "on the fly" through the use of a "variable Translator factory".

Since each Translator embodies the knowledge and rules regarding how to convert an XML model to an object model, and how to convert object models to XML, it is thus independent of the particular Renderer that is being used, whether it be SAX, DOM, or some other Renderer. All of the complex rules that do the mapping are embodied in the Translator, and thus if changes need to be made, they are made at the Translator level. This allows the Translators to be generic unless, as in a smaller number of cases, there is complex logic that needs to be executed in order to do the translation. Custom rules are input for these particular translations to deal with these situations. Even in the custom case, the Translator itself contains no "knowledge" of SAX, DOM, or any other rendering mechanism, but rather only knows how to execute the conversions, such that the Translator is shared by all Renderer embodiments.

In the prior art systems, the function of the Translators was encapsulated within the adapter, which bound the user to using the DOM model for DOM translations, the SAX model for SAX translations, etc. In the present invention, the working of the DOM has been separated from the translation rules.

Thus, the present invention removes the binding of the mapping logic of the two domains from the adapters and places it in a generic object (the Translator). This allows the use of different parser mechanisms that may or may not keep the domains in synch at all times, i.e., the system is very flexible. The mapping logic can be reused such that the parser/Renderer that works best in any particular condition without having to rewrite all of the mapping logic to fit the parsing implementation.

In the prior art the logic for determining the meta-model feature for a given XML tag name is tightly coupled with the parsing mechanism (e.g, SAX, DOM, etc.). Even though the same object model is built from the same XML file, it is done in very different ways due to the different ways in which the various parsers operate. This causes a great deal of inconsistencies between the different mechanisms because the mapping information from the tag name to the meta-model feature is often different because the code for handling the XML values and converting them to the object model is separately written and, at times, inconsistent. In addition, when a problem is found in one parsing path, it had to be fixed separately in each implementation.

In the present invention, the same object model can be loaded from the same XML file using several different parsing mechanisms. However, the logic to map XML tag names to meta-model features is initialized from pre-coded Translator classes and placed in a tree structure of Translators which are then shared by the different parser implementations. Thus, when a problem is found with the mapping logic, one change is made to the appropriate Translator and all parser implementations pick up the change. This mechanism also allows another parsing mechanism to be quickly added without having to figure out all of the XML tag to meta-model feature mappings again.

In many situations using prior art mechanisms, the resultant object model generated using diverse implementation methods (e.g., SAX API vs. DOM API) are essentially identical; however, the differing methods requires that the mapping process be performed in tandem. This dual-path process is inefficient.

Using the present invention, the mapping of each XML tag to a particular structural feature to be used by the object model is essentially performed in advance so that XML tag/structural feature pairs can essentially be selected from a Translator, regardless of the parsing method being utilized. In effect, the mapping becomes generic and can be used across all platforms. The parser, in all cases, identifies a particular tag name, and the Translators correlate that tag name to a structural feature and this information is then utilized to create the appropriate object model or XML rendering.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for rendering XML from an object model, an object model from XML, or both, the XML containing a plurality of different XML tags, the Method comprising:
   for each XML tag in the XML, defining a translator, each translator including a common, parser-independent mappings for the XML tag of said XML to an associated object model feature for the XML tag, whereby the parser-independent mappings are each useable with multiple types of parser mechanisms including at least parser mechanisms that use a document object model and parser mechanisms that are event driven; and
   defining a plurality of parser specific renderers that function generically with all common mappings;
   wherein said defined parser-specific renderers:
   render an object model using a parser-specific implementation in conjunction with the common mappings to translate XML to object model instances; and
   render XML using a parser-specific implementation in conjunction with the common mappings to translate object model instances to XML.

2. The method of claim 1, wherein the translators are encoded into translator classes.

3. The method of claim 2, wherein said object model feature comprises one of:
   a simple attribute on an object type; and
   an association to another related "child" object in said object model.

4. The method of claim 3, wherein said translator classes contain references to child translators, thereby forming a tree structure corresponding to said object model.

5. The method of claim 3, wherein said translator classes comprise executable code for performing conversions between XML data and object model data.

6. The method of claim 5, wherein said translator classes include:
   a generic translator class, using said mapping information and one or more predetermined default processes to perform said conversions; and
   a custom translator class, using customized executable code to perform said conversions.

7. A method for rendering an object model in terms of XML, the XML comprising a plurality of XML tags, the method comprising:
   for each XML tag in the XML defining translators, each translator including common, parser-independent mappings for the XML tag of said XML to an associated object model feature, whereby the parser-independent mappings are each useable with multiple types of parser mechanisms including at least parser mechanisms that use a document object model and parser mechanisms that are event driven;
parsing the XML using a parser-specific implementation, including creating a parser specific adapter for each XML tag of the XML; and
translating the results of said parsing with the parser specific adapter to render the object model, wherein each parser specific adapter uses the common, parser-independent mappings of the associated translator for each XML tag to produce the object model.

8. The method of claim 7, wherein the defining step includes:
mapping each XML tag to a feature of a meta model describing each associated object model feature.

9. The method of claim 8, wherein said mappings of each XML tag to a feature of a meta model describing each associated object model feature are encoded into translator classes.

10. The method of claim 8, wherein said object model feature comprises one of:
a simple attribute on an object type; and
an association to another related "child" object in said object model.

11. The method of claim 10, wherein said translator classes contain references to child translators, thereby forming a tree structure corresponding to said object model.

12. The method of claim 10, wherein said translator classes comprise executable code for performing conversions between XML data and object model data.

13. The method of claim 12, wherein said translator classes include:
a generic translator class, using said mapping information and one or more predetermined default processes to perform said conversions; and
a custom translator class, using customized executable code to perform said conversions.

14. A method for rendering XML in terms of an object model, the object model containing a plurality of object nodes, each object node containing object features, the XML containing a plurality of XML tags, each XML tags associated with an object model feature, the method comprising:
for each object model feature, defining a translator, each translator including common, parser-independent mappings for the object model feature to an associated XML tag of said XML, whereby the parser-independent mappings are each useable with multiple types of parser mechanisms including at least parser mechanisms that use a document object model and parser mechanisms that are event driven;
traversing each object node of said object model to generate the associated XML tags of said XML, using the common, parser-independent mappings; and,
rendering the XML with the generated XML tags.

15. The method of claim 14, wherein the defining step includes:
mapping a feature of a meta model describing each object model feature to each associated XML tag.

16. The method of claim 15, wherein said mappings of a feature of a meta model describing each associated object model feature to each XML tag are encoded into translator classes.

17. The method of claim 16, wherein said translator classes contain references to child translators, thereby forming a tree structure corresponding to said object model.

18. The method of claim 14, wherein at least one of said object model features comprises one of:
a simple attribute on an object type; and
an association to another related "child" object in said object model.

19. The method of claim 18, wherein said translators comprise executable code for performing conversions between XML tags and object model features.

20. The method of claim 19, wherein said translator classes include:
a generic translator class, using said mapping information and one or more predetermined default processes to perform said conversions; and
a custom translator class, using customized executable code to perform said conversions.

21. A system for rendering XML from an object model and/or an object model from XML, the XML containing a plurality of different XML tags, the method comprising:
means for defining translators for each XML tag of said XML, each translator containing common, parser-independent mappings for the XML tag of said XML to an associated object model feature, whereby the parser-independent mappings are each useable with multiple types of parser mechanisms that use a document object model and parser mechanisms that are event driven; and
means for defining a plurality of parser specific renderers that function generically with all common mappings;
wherein said defined parser-specific renderers:
render an object model using a parser-specific implementation in conjunction with the common mappings to translate XML to object model instances; and
render XML using a parser-specific implementation in conjunction with the common mappings to translate object model instances to XML.

22. The system of claim 21, wherein said mappings of each XML tag to a feature of a meta model describing each associated object model feature are encoded into translator classes.

23. The system of claim 22, wherein said object model feature comprises one of:
a simple attribute on an object type; and
an association to another related "child" object in said object model.

24. The system of claim 23, wherein said translator classes contain references to child translators, thereby forming a tree structure corresponding to said object model.

25. The system of claim 23, wherein said translators are encoded as translator classes and comprise executable code for performing conversions between XML data and object model data.

26. The system of claim 25, wherein said translator classes include: a generic translator class, using said mapping information and one or more predetermined default processes to perform said conversions; and
a custom translator class, using customized executable code to perform said conversions.

27. The method of claim 1, wherein:
each of said plurality of parser specific renderers are capable of processing said XML; and
each of said plurality of parser specific renderers are capable of processing said object model.

28. The method of claim 1 wherein each of said plurality of parser specific renderers can be substituted dynamically in a running system.

* * * * *